US012562295B2

(12) United States Patent
Merkin et al.

(10) Patent No.: US 12,562,295 B2
(45) Date of Patent: Feb. 24, 2026

(54) TRIMMING RESISTOR USING MODULATED SIGNAL

(71) Applicant: Texas Instruments Incorporated, Dallas, TX (US)

(72) Inventors: Timothy Merkin, Princeton, TX (US); Pourya Assem, Dallas, TX (US); Kevin Scoones, San Jose, TX (US); Jianquan Liao, Shanghai (CN); Zhenzhen Chen, Shanghai (CN); Kannan Krishna, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 88 days.

(21) Appl. No.: 18/585,191

(22) Filed: Feb. 23, 2024

(65) Prior Publication Data

US 2025/0246345 A1 Jul. 31, 2025

Related U.S. Application Data

(60) Provisional application No. 63/624,823, filed on Jan. 25, 2024.

(51) Int. Cl.
*H01C 1/16* (2006.01)
*H04R 3/04* (2006.01)

(52) U.S. Cl.
CPC ................. *H01C 1/16* (2013.01); *H04R 3/04* (2013.01)

(58) Field of Classification Search
CPC .......... H01C 1/16; H01C 10/00; H01C 10/16; H04R 3/04

(Continued)

(56) References Cited

U.S. PATENT DOCUMENTS

| | | | |
|---|---|---|---|
| 5,898,340 | A | 4/1999 | Chatterjee |
| 6,078,214 | A | 6/2000 | Zhang |

(Continued)

FOREIGN PATENT DOCUMENTS

| | | | |
|---|---|---|---|
| WO | 2007016428 | A2 | 2/2007 |
| WO | 2012131282 | A1 | 10/2012 |

OTHER PUBLICATIONS

Mykhaylo A Teplechuk et al: "True Filterless Class-D Audio Amplifier", IEEE Journal of Solid-State Circuits, IEEE, USA, vol. 46, No. 12, Nov. 23, 2011 (Nov. 23, 2011), pp. 2784-2793, XP011369696, ISSN: 0018-9200, DOI: 10.1109/JSSC.2011.2162913.

(Continued)

*Primary Examiner* — Xu Mei
(74) *Attorney, Agent, or Firm* — Xianghui Huang; Frank D. Cimino

(57) ABSTRACT

In one example, an apparatus comprise: a first power stage having a first power stage input and a first power stage output; a second power stage having a second power stage input and a second power stage output; a driver circuit having a first driver input, a second driver input, a first driver output, and a second driver output, the first driver output coupled to the first power stage input, and the second driver output coupled to the second power stage input; a first resistor network coupled between a first input of a pair of differential inputs and the first power stage output, the first resistor network including a trimmable resistor network and a trim input; a second resistor network coupled between a second input of the pair of differential inputs and the second power stage output; and a control circuit having a trim output coupled to the trim input.

20 Claims, 18 Drawing Sheets

(58) Field of Classification Search
USPC ........... 381/111–117, 120, 121, 123; 330/10, 330/251, 207 A, 61 R, 284
See application file for complete search history.

(56) References Cited

U.S. PATENT DOCUMENTS

| | | | | |
|---|---|---|---|---|
| 6,249,182 | B1 | 6/2001 | Pullen | |
| 6,775,385 | B1 * | 8/2004 | Coombs | H04R 3/04 381/98 |
| 6,788,137 | B2 | 9/2004 | Morita | |
| 7,656,202 | B2 | 2/2010 | Kaiho | |
| 7,816,981 | B2 | 10/2010 | Morishima | |
| 8,283,979 | B2 | 10/2012 | Stanley | |
| 8,558,609 | B2 | 10/2013 | Fang | |
| 9,276,530 | B1 | 3/2016 | Liu | |
| 9,473,087 | B2 | 10/2016 | Lesso | |
| 9,917,557 | B1 | 3/2018 | Zhu et al. | |
| 10,367,458 | B2 | 7/2019 | Azuhata | |
| 10,877,087 | B1 | 12/2020 | Joharapurkar | |
| 11,482,852 | B2 | 10/2022 | Djelassi-Tscheck | |
| 12,034,420 | B2 | 7/2024 | Xia | |
| 12,401,330 | B2 * | 8/2025 | Sakai | H03K 4/066 |
| 2002/0089316 | A1 | 7/2002 | Liu | |
| 2006/0091945 | A1 | 5/2006 | Wegner | |
| 2009/0128237 | A1 | 5/2009 | Attwood | |
| 2011/0133836 | A1 | 6/2011 | Yu | |
| 2011/0254625 | A1 | 10/2011 | Kohut | |
| 2012/0182069 | A1 | 7/2012 | Stanley | |
| 2014/0203870 | A1 | 7/2014 | Williams | |
| 2015/0109055 | A1 | 4/2015 | Botti | |
| 2015/0171793 | A1 | 6/2015 | Regier | |
| 2017/0054416 | A1 | 2/2017 | Zhu | |
| 2017/0201827 | A1 * | 7/2017 | Kang | H03G 1/0088 |
| 2019/0319540 | A1 * | 10/2019 | Arno | H02M 1/0025 |
| 2023/0049670 | A1 | 2/2023 | Xia et al. | |
| 2023/0098806 | A1 | 3/2023 | Xia et al. | |
| 2023/0412134 | A1 | 12/2023 | Lind | |

OTHER PUBLICATIONS

Written Opinion of the International Searching Authority for PCT/US2022/044204, Jan. 6, 2023, 4 pages.

International Search Report for PCT/US2022/044204 dated Jan. 6, 2023; 3 pages.

United States Patent and Trademark Office, Office Action for U.S. Appl. No. 17/491,133, Oct. 23, 2023, 6 pages.

Yang Boon Quek, "Class-D LC Filter Design Application Report," Texas Instruments Incorporated, Feb. 2015, 27 pages.

* cited by examiner

502

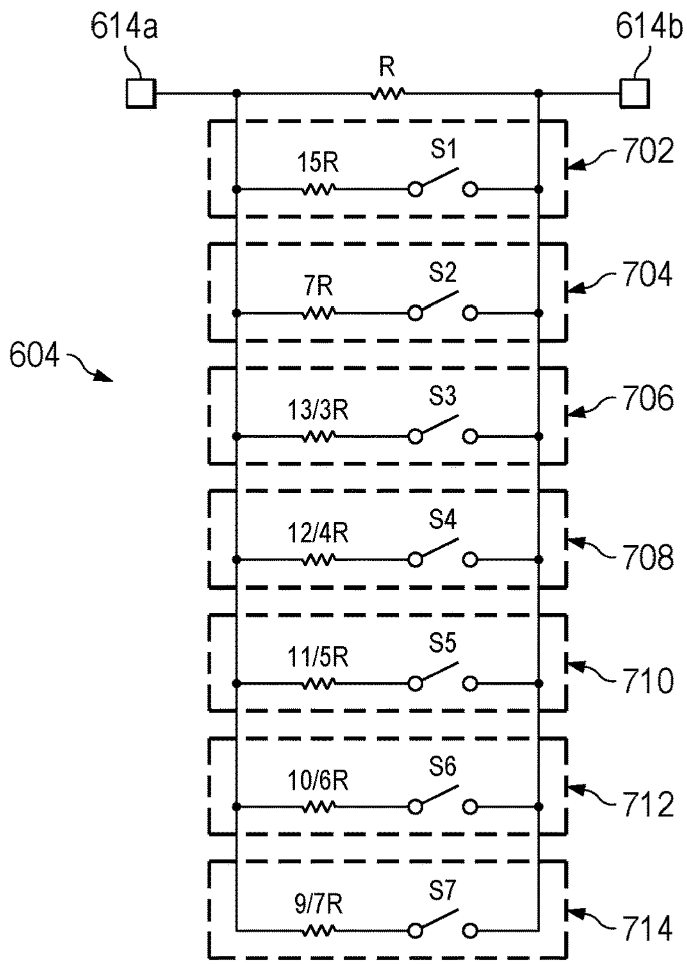

702

| | TRIM TARGET | PARALLEL RES | UNIT RES=4R | PARALLEL RES STRUCTURE | PARALLEL RES NUMBER |
|---|---|---|---|---|---|
| S1 ON | $\frac{15}{16}R$ | $\frac{15}{1}R$ | $\frac{15}{4}$ | 3+(1\|\|3) | 7 |
| S2 ON | $\frac{14}{16}R$ | $\frac{14}{2}R$ | $\frac{14}{8}$ | 1+(1\|\|3) | 5 |
| S3 ON | $\frac{13}{16}R$ | $\frac{13}{3}R$ | $\frac{13}{12}$ | $1+\frac{1}{12}$ | 13 |
| S4 ON | $\frac{12}{16}R$ | $\frac{12}{4}R$ | $\frac{12}{16}$ | (1\|\|3) | 4 |
| S5 ON | $\frac{11}{16}R$ | $\frac{11}{5}R$ | $\frac{11}{20}$ | $1\|\|(1+\frac{1}{4}\|\|2)$ | 8 |
| S6 ON | $\frac{10}{16}R$ | $\frac{10}{6}R$ | $\frac{10}{24}$ | $\frac{1}{2}\|\|(2+\frac{1}{2})$ | 6 |
| S7 ON | $\frac{9}{16}R$ | $\frac{9}{7}R$ | $\frac{9}{28}$ | $\frac{1}{3}\|\|9)$ | 12 |
| | | | | | 55 |

TRIM RANGE: 9/16R~R

TRIM RESOLUTION: $\frac{1}{16}R$

FIG. 7A

| S2:S1:S0 | RESISTOR | RESISTOR TRIM |
|---|---|---|
| 000 | R+R+R | 0 |
| 001 | R+R+15/16R | -1/16R |
| 010 | R+7/8R+R | -2/16R |
| 011 | R+7/8R+15/16R | -3/16R |
| 100 | 3/4R+R+R | -4/16R |
| 101 | 3/4R+R+15/16R | -5/16R |
| 110 | 3/4R+7/8R+R | -6/16R |
| 111 | 3/4R+7/8R+15/16R | -7/16R |

TRIM TARGET: 0~-7/16R
TRIM RESOLUTION: 1/16R
0 IS FOR SWITCH OFF

1200

1202

TRIMMING RESISTOR USING MODULATED SIGNAL

CROSS-REFERENCE TO RELATED APPLICATIONS

The present application claims priority to United States provisional patent application "TRIMMING RESISTOR USING MODULATED SIGNAL," Application No. 63/624,823, filed Jan. 25, 2024, and is related to: (a) U.S. application Ser. No. 18/385,848, entitled "METHODS AND APPARATUS TO MODULATE SIGNALS USING MULTI-CLASS MODULATION CIRCUITRY", filed on Oct. 31, 2023; (b) U.S. application Ser. No. 17/402,264, entitled "METHODS AND APPARATUS TO GENERATE A MODULATION PROTOCOL TO OUTPUT AUDIO", filed on Aug. 13, 2021; and (c) U.S. application Ser. No. 17/491,133, entitled "SWITCHING AMPLIFIER HAVING LINEAR TRANSITION TOTEM POLE MODULATION", filed on Sep. 30, 2021, which are hereby incorporated by reference in their entireties.

BACKGROUND

A system may include a resistor network for various applications. For example, an audio system includes an audio amplifier and a speaker. The audio amplifier can receive audio signals representing sound from an audio source, amplify and/or process the audio signals, and provide the amplified/processed audio signals at two electrical terminals of the speaker. The amplified/processed electrical signals can set a voltage difference across the two electrical terminals of the speaker, and the speaker can generate the sound represented in those signals based on the voltage difference. The audio system may include a resistor network to provide negative feedback, which can improve the linearity and set the amplification gain of the audio amplifier in converting the audio signals to the electrical signals for the speaker. Also, a reference generator, such as a reference current generator, a reference voltage generator, etc., may also include a resistor network to define a reference current or a reference voltage provided by the reference generator. Further, transmission line impedance/phase matching circuits, differential drivers, etc., may also include or drive a resistor network.

Some systems may include a pair of resistor networks. For example, a fully differential amplifier may include a pair of resistor networks, with one resistor network for the positive signal path and another resistor network for the negative signal path, to provide negative feedback for both the positive and negative signal paths. Also, a reference generator may include a pair of resistors (or resistor networks) to generate a reference current/voltage, or to generate multiple matched reference currents/voltages. Impedance/phase matching circuits, differential drivers, etc., may also include or drive a pair of resistor networks, and rely on the resistor networks being matched to perform impedance/phase matching and to drive/receive differential signals. Mismatches between the pair of resistor networks can introduce unwanted signals at the system output, such as common mode harmonics in the differential amplifier outputs, errors in the reference current/voltage(s), etc., or degrade the signal integrity in transmission lines or systems that rely on matching of loads, all of which can degrade the performance of the system.

SUMMARY

In one example, an apparatus comprises: a first power stage having a first power stage input and a first power stage output; a second power stage having a second power stage input and a second power stage output; an audio driver circuit having a first driver input, a second driver input, a first driver output, and a second driver output, the first driver output coupled to the first power stage input, and the second driver output coupled to the second power stage input; a first resistor network coupled between a first audio input of a pair of differential audio inputs and the first power stage output, the first resistor network including a trimmable resistor network, the first resistor network having a first intermediate terminal coupled to the first driver input, and a trim input; a second resistor network coupled between a second audio input of the pair of differential audio inputs and the second power stage output, the second resistor network having a second intermediate terminal coupled to the second driver input; and a trim control circuit having a control input and a trim output, the trim output coupled to the trim input.

In one example, an apparatus comprises: a circuit having a first terminal and a second terminal; a first resistor coupled to the first terminal, the first resistor having a first resistance; a second resistor coupled to the second terminal, the second resistor having a trim input; and a modulator circuit having a control input and a modulator output, the modulator output coupled to the trim input, the modulator circuit configured to set a duty cycle of a modulated signal at the modulator output based on matching an average second resistance of the second resistor to the first resistance.

In one example, a method comprises: setting a first terminal of a first resistor network and a second terminal of a second resistor network to a first voltage, the first resistor network having a third terminal and the second resistor network having a fourth terminal, the second resistor network including a first trimmable resistor having a first trim input and a second trimmable second resistor having a second trim input coupled between the second terminal and the fourth terminal; providing a modulated signal having a first duty cycle at the first trim input based on a first trim code; with the modulated signal having the first duty cycle, sweeping a second trim code at the second trim input through a set of first values; selecting one of the first values for which a voltage difference between the third and fourth terminals is at a minimum; with the second trim code at the second trim input set to the one of the first values, varying a duty cycle of the modulated signal by sweeping the first trim code through a set of second values; selecting one of the second values for which the voltage difference is below a threshold; determining a calibrated first trim code based on the one of the first values; determining a calibrated second trim code based on the one of the second values; and storing the calibrated first trim code and the calibrated second trim code in a memory.

BRIEF DESCRIPTION OF THE DRAWINGS

FIGS. 7A and 7B are schematics illustrating examples of trimmable resistor networks.

DETAILED DESCRIPTION

Figure 1A:
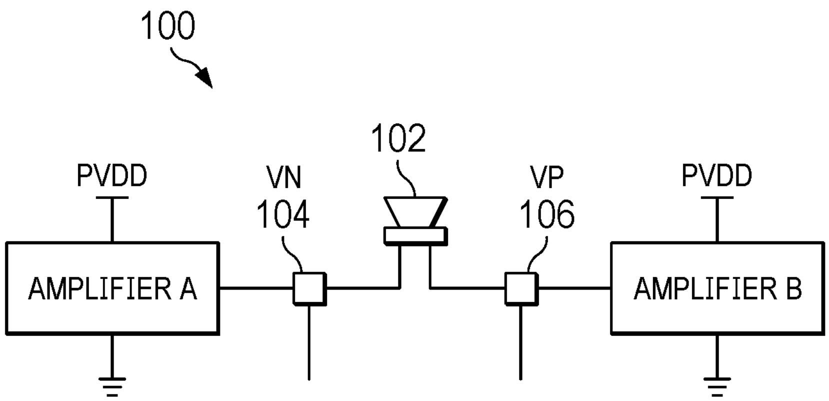
FIGS. 1A and 1B are schematics illustrating examples of an audio system.

FIG. 1A illustrates an example audio system 100. As shown, system 100 includes a first amplifier (labelled amplifier A) and a second amplifier (labelled amplifier B) driving speaker 102. Amplifier A can be coupled to terminal 104 of speaker 102, and amplifier B can be coupled to terminal 106 of speaker 102. Amplifiers A and B can be of different types with different control schemes. For example, amplifier A can be of a non-switching type, and amplifier B can be of a switching type.

A switching amplifier includes a power stage that generates a multilevel signal (e.g., a binary signal, a trilevel signal, etc.) by selectively connecting the power stage output to one of multiple voltage sources. In some examples, a switching amplifier may operate as a class D amplifier. The switching amplifier may be driven by a modulating circuit that receives a sinusoidal audio signal and generates pulse width modulated (PWM) signals, pulse density signals, and/or any other type of modulated control signals to control the power stage to also generate a modulated signal having discrete signal levels (e.g., binary, ternary, etc.). The modulated signal provided by the power stage can have a timing property, such as duty cycle, pulse width, etc., modulated/varied to reflect an instantaneous amplitude of the audio signal. The modulated signal generated by the power stage can be filtered (e.g., by a low pass filter, or by the inductance of a speaker) to generate an amplified version of the sinusoidal audio signal, and the amplified sinusoidal audio signal can be fed to the speaker. The low pass filter may include an LC filter including a series inductor coupled between the output of the switching amplifier and the speaker, and a shunt inductor coupled between the speaker and the ground.

A non-switching amplifier may include another power stage driven by a control circuit including a linear amplifier. The control circuit can receive a sinusoidal audio signal, and provide control signals having magnitudes that varies (e.g., linearly or closed to be linearly) according to an instantaneous magnitude of the audio signal to the non-switching amplifier. Responsive to the control signals, the non-switching amplifier can also generate an analog signal having a magnitude that can track the audio signal when the non-switching amplifier operates in a linear mode where the analog signal voltage level is below the supply voltage of the power stage. In a case where the analog signal voltage level is above the supply voltage, the non-switching amplifier may operate in a saturation mode where the analog signal is clipped and limited at the supply voltage. In some examples, the non-switching amplifier may operate as a class A amplifier, a class AB amplifier, etc. The output of the non-switching amplifier can also be filtered (e.g., by another low pass filter) to attenuate high frequency components (e.g., noise) and distortions caused by saturation/clipping. But because the signal output by the non-switching amplifier is in analog and continuous form, the low pass filter can have fewer components. For example, instead of an LC filter, an audio system can include a capacitor at the non-switching amplifier output to perform the filtering.

Figure 1B:
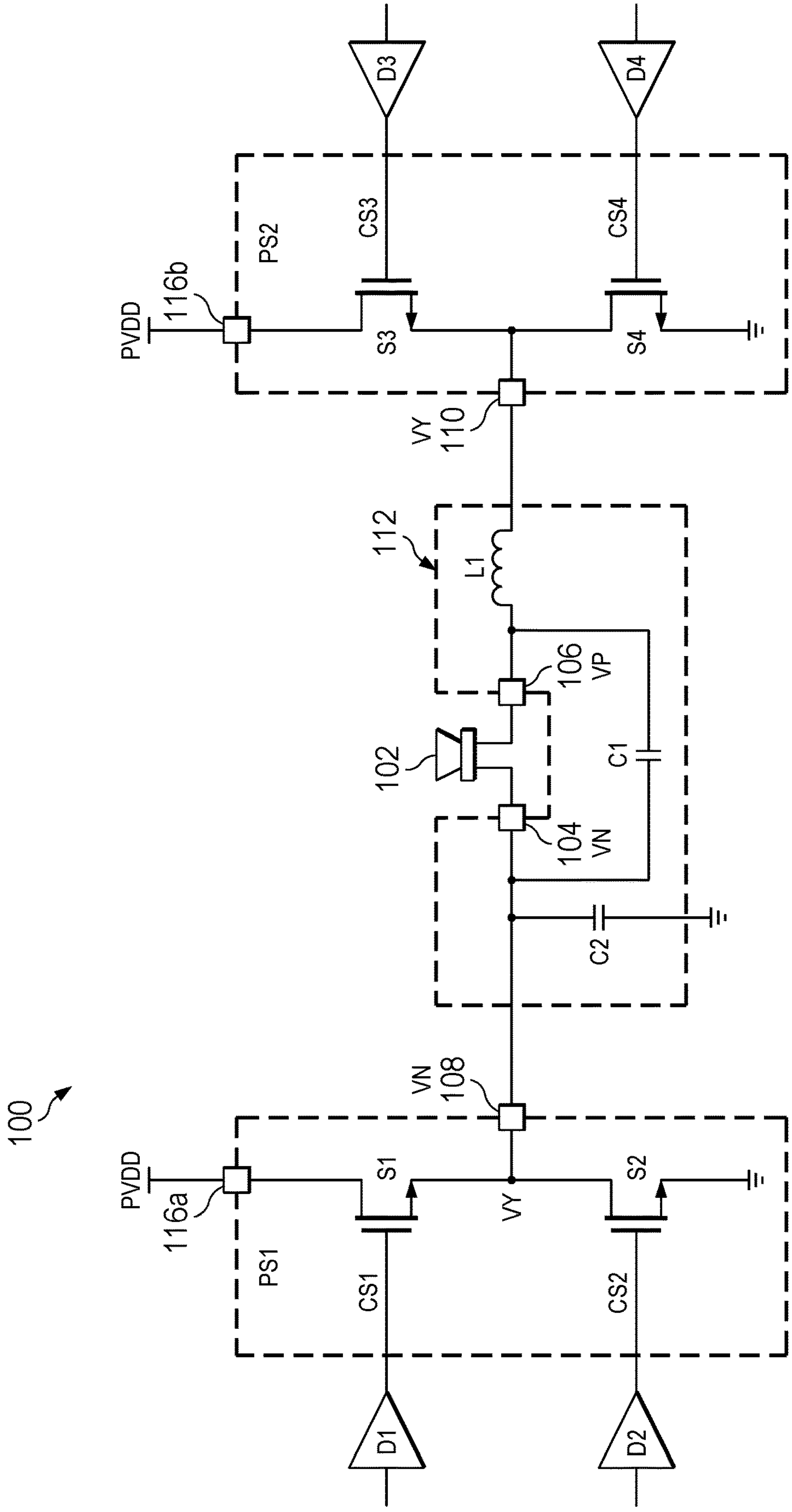

FIG. 1B illustrates examples of internal components of system 100 of FIG. 1A. The system 100 of FIG. 1B includes a first power stage PS1 having a first output terminal 108, and a second power stage PS2 having a second output terminal 110. First power stage PS1 can represent (or can be part of) amplifier A of FIG. 1A, and second power stage PS2 can represent (or can be part of) amplifier B of FIG. 1A. The first output terminal 108 and the second output terminal 110 are coupled to a LC filter circuit 112. Two speaker terminals 104 and 106 (also described with respect to FIG. 1A) of the LC filter circuit 112 are coupled to the speaker 102.

The power stage PS1 comprises a first transistor S1 and a second transistor S2 coupled in series between a power terminal 116*a* (e.g., receiving a power supply PVDD) and a ground terminal. For example, a first current terminal of the transistor S1 is coupled to the power terminal 116*a*, and a second current terminal of the transistor S1 is coupled to the output terminal 108. A first current terminal of the transistor S2 is coupled to the output terminal 108, and a second current terminal of the transistor S2 is coupled to the ground terminal.

The transistor S1 further includes a control terminal coupled to a first power stage input that receives a control signal CS1 from a driver D1, and the transistor S2 includes a control terminal coupled to a second power stage input that receives a control signal CS2 from another driver D2. The transistors S1 and S2 can set the voltage VN at output terminal 108 of the power stage PS1 responsive to control signals CS1 and CS2. In FIG. 1B, power stage PS1 can be controlled as a non-switching amplifier (e.g., class AB, class A, etc.), where CS1 and CS2 can each have a magnitude that varies (e.g., linearly or closed to be linearly) according to an instantaneous magnitude of an audio signal. For example, during a first half cycle of an audio signal, the transistor S1 is on or enabled, the transistor S2 is off or disabled, the transistor S1 can vary a magnitude of the voltage VN based on a magnitude of CS1, which can reflect/track an instantaneous magnitude of the audio signal (if operating in linear mode) during the first half cycle. Also, during a second half cycle of the audio signal, the transistor S1 is off or disabled, the transistor S2 is on or enabled, and the transistor S2 can vary a magnitude of the voltage VN based on a magnitude of CS2, which can also reflect/track an instantaneous magnitude of the audio signal during the second half cycle (if operating in linear mode). In a case where the audio signal is a sinusoidal signal, the voltage VN can be (or close to be) an amplified version of the sinusoidal signal, and the voltage VN can have a same frequency as the audio signal. On the other hand, the audio signal may also saturate the power stage PS1, in which case the voltage VN may be clipped at the PVDD voltage or at the ground voltage.

Also, the power stage PS2 comprises a third transistor S3 and a fourth transistor S4 coupled in series between a power terminal 116*b* (e.g., receiving a power supply PVDD) and a ground terminal. In an example, the power terminals 116*a* and 116*b* may be a same power terminal shared by both the power stages PS1 and PS2 (or the power terminals 116*a* and 116*b* may be coupled to a common power terminal), whereas in another example the power terminals 116*a* and 116*b* can be coupled to different voltage sources.

As illustrated, a first current terminal of the transistor S3 is coupled to the power terminal 116*b*, and a second current terminal of the transistor S3 is coupled to the output terminal 110 having a voltage of VY. A first current terminal of the transistor S4 is coupled to the output terminal 110, and a second current terminal of the transistor S4 is coupled to the ground terminal.

The transistor S3 further includes a control terminal coupled to a third power stage input that receives a control signal CS3 from a driver D3, and the transistor S4 further includes a control terminal coupled to a fourth power stage input that receives a control signal CS4 from another driver D4. The transistors S3 and S4 can set the voltage VY at output terminal 110 of the power stage PS2 responsive to control signals CS3 and CS4.

In FIG. 1B, power stage PS2 can be controlled as a switching amplifier (e.g., class D), where control signals CS3 and CS4 are pulse width modulated signals, pulse density signals, and/or any other type of modulated control signals having binary magnitudes. Depending on the magnitude of the audio signal, one of transistors S3 or S4 can be turned on to connect one of power terminal 116*b* or ground terminal to output terminal 110. Responsive to CS3 and CS4, power stages PS2 can also generate a modulated signal. The modulated signal provided by the power stage can have a timing property, such as duty cycle, pulse width, etc., modulated/varied to reflect an instantaneous magnitude of the audio signal. The transistors S3 and S4 can provide VY as a modulated signal at output terminal 110 responsive to CS4. The modulated signal VY at output terminal 110 can have a much higher frequency than the audio signal as well as the signal VX at output terminal 108.

In FIG. 1B, the transistors S1, S2, S3, and S4 are illustrated as n-channel metal oxide semiconductor (NMOS) field effect transistors (FETs). In other examples, the transistors S1, S2, S3, and S4 can be other types of transistors, such as p-channel MOSFET (PMOS), laterally-diffused metal-oxide semiconductor (LDMOS) FETs, Gallium Nitride (GaN) FETs, NPN or PNP bipolar junction transistor (BJT), etc.

The LC filter circuit 112 includes an inductor L1 coupled between the output terminal 110 and the speaker terminal 106, a capacitor C1 coupled between the speaker terminals 104 and 106, and another capacitor C2 coupled between the speaker terminal 104 and the ground terminal. The inductor L1 and capacitor C1 filter the modulated signal VY provided at the output terminal 110 into a sinusoidal signal VP at the speaker terminal 106 that is output to the speaker 102 to output corresponding audio. Capacitor C2 can also filter signal VN to further suppress non-linearities in the signal VN.

System 100 also includes a control circuit (not shown in FIG. 1B) that generates control signals that respectively drives the driver circuits D1, D2, D3, D4 based on audio signals. Example operations of system 100 are described in related U.S. application Ser. No. 17/402,264, entitled "Methods and Apparatus to Generated a Modulation Protocol to Output Audio," filed on Aug. 13, 2021, and related U.S. application Ser. No. 17/491,133, entitled "Switching amplifier having linear transition totem pole modulation," filed on Sep. 30, 2021, which are hereby incorporated by reference in their entireties as described above.

Figure 2:
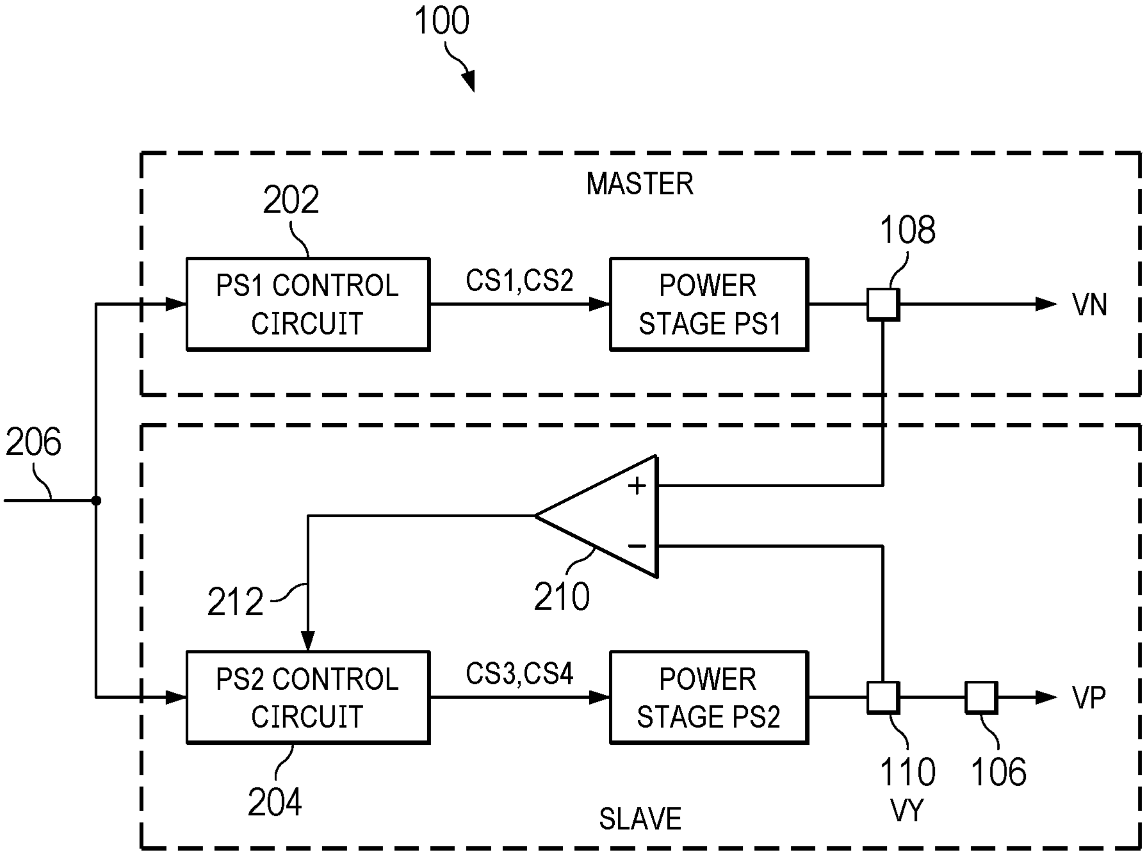
FIGS. 2 and 3 are schematics illustrating additional examples of the audio system of FIGS. 1A and 1B.

FIG. 2 illustrates examples of internal components of system 100. FIG. 2 illustrates that system 100 includes, in addition to power stages PS1 and PS2, a control circuit 202 that provides the control signals CS1 and CS2 to power stage PS1, and a control circuit 204 that provides the control signals CS3 and CS4 to power stage PS2. During startup and shutdown, both control circuits 202 and 204 may not receive an audio signal 206. During normal operation, control circuits 202 and 204 may receive audio signal 206.

In the example of FIG. 2, control circuit 202 can control power stage PS1 to operate as a non-switching amplifier (e.g., a class AB amplifier). Control circuit 202 can include a linear amplifier to generate control signals CS1 and CS2 by amplifying audio signal 206 (if present). Power stage PS1 can provide a VN voltage at first output terminal 108 having a magnitude that tracks audio signal 206. Also, control circuit 204 can control power stage PS2 to operate as a switching amplifier (e.g., a class D amplifier). Control circuit 204 can include modulated signal generator to generate control signals CS3 and CS4 as modulated signals. In some examples, control circuit 204 can include a pulse width modulation (PWM) signal generator to generate control signals CS3 and CS4 as PWM signals, where the pulse width of CS3 and CS4 can be modulated based on an instantaneous amplitude of audio signal 206. The difference between VN and VP, after VN and VP being filtered by the LC filter circuit 112, can become an amplified audio signal.

As shown in FIG. 2, to further improve the matching between the common mode voltages between VN and VP, PS1 control circuit 202 and PS2 control circuit 204 can operate in a master-slave configuration. In the master-slave configuration, PS1 control circuit 202 and power stage PS1 is a master, and PS2 control circuit 204 and power stage PS2 is a slave. Specifically, PS1 control circuit can drive power stage PS1 based on audio signal 206 (if present), or other signals. On the other hand, PS2 control circuit 204 can include a subtraction circuit 210 (e.g., an amplifier) that receives VN and VP (or a filtered version of VY) as feedback signals and generates a difference signal 212 representing a difference between VN and VP. PS2 control circuit 204 can adjust control signals CS3 and CS4 (and VY/VP) based on difference signal 212. For example, PS2 control circuit 204 can adjust control signals CS3 and CS4 to minimize (or reduce) difference signal 212, to improve the matching between the common mode voltages of VN and VP. PS2 control circuit 204 can have a higher bandwidth than PS1 control circuit 202, which allows PS2 control circuit 204 to adjust CS3 and CS4 responsive to both audio signal 206 and difference signal 212.

Figure 3:
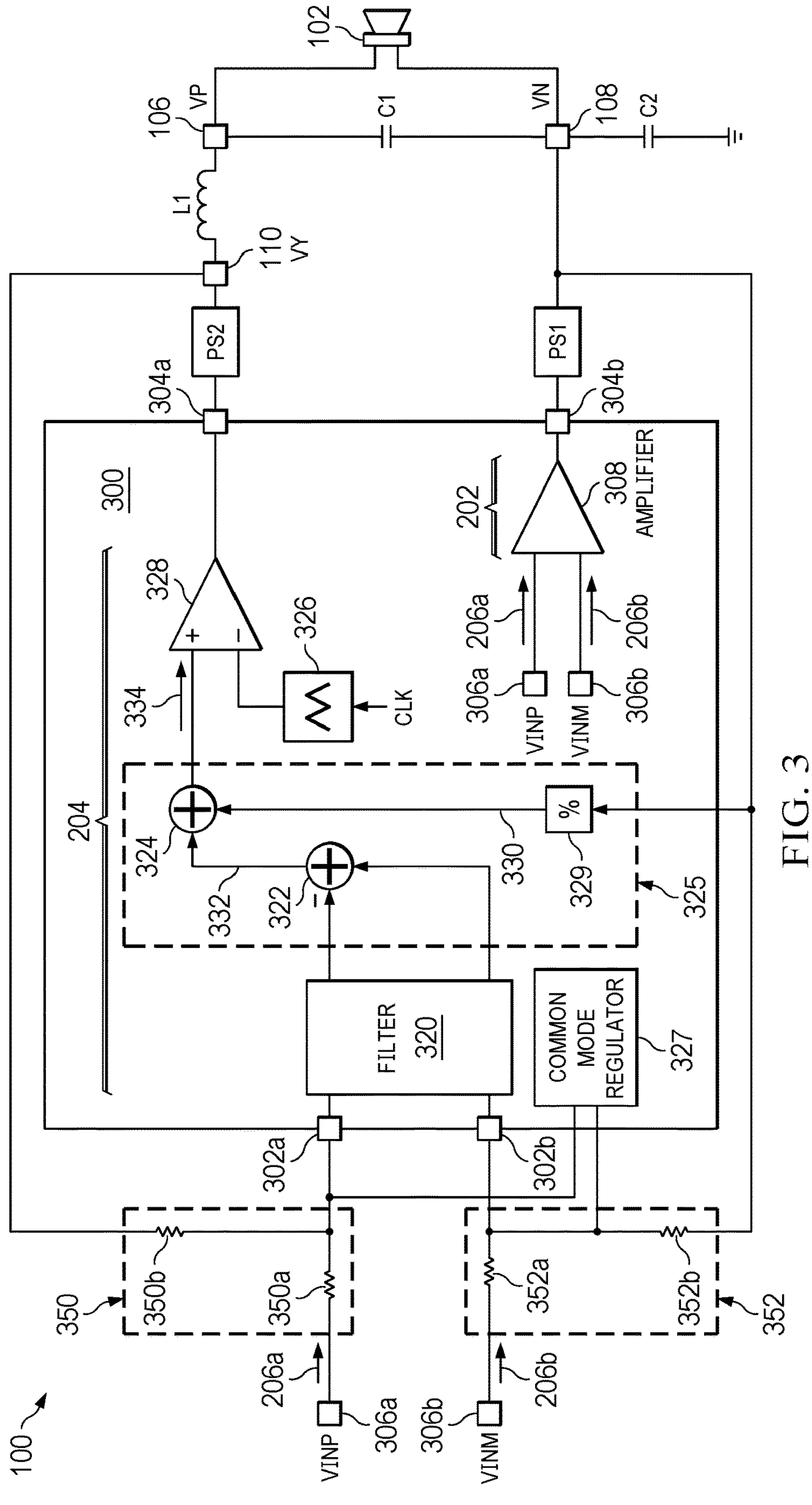

FIG. 3 illustrates examples of internal components of system 100 of FIG. 2. Referring to FIG. 3, system 100 can include an audio driver circuit 300 having driver inputs 302*a*, 302*b*, and driver outputs 304*a* and 304*b*. The driver outputs 304*a* and 304*b* are coupled to, respectively, the inputs of power stages PS1 and PS2. Audio driver circuit 300 includes PS1 control circuit 202 and PS2 control circuit 204. System 100 also includes audio inputs 306*a* and 306*b* to receive differential audio signals 206*a* (also labelled VINP) and 206*b* (also labelled VINM) of sinusoidal audio signals 206.

PS1 control circuit 202 includes an amplifier 308 coupled to audio inputs 306*a* and 306*b*. In some examples, amplifier 308 can be a linear differential amplifier 308. Amplifier 308 can receive differential audio signals 206*a* and 206*b*, and provide control signals CS1 and CS2 by amplifying audio signals 206*a* and 206*b* to set voltage VN at first output terminal 106.

Also, PS2 control circuit 204 includes a filter 320 (e.g., a loop filter), a subtraction circuit 322, a subtraction circuit 324, a periodic ramp generator 326, a comparator 328, and a voltage scaler circuit 329. Subtraction circuit 322, subtraction circuit 324, and voltage scaler circuit 329 are collectively part of a signal combination circuit 325. In some examples, filter 320 can include a multi-stage loop filter.

Voltage scaler circuit 329 provides a scaled down version of the VN voltage as a feedback signal 330. Voltage scaler circuit 329 can also remove the common mode/DC bias component of the VN voltage, and provide a scaled down version of the AC (alternating current) component of the VN voltage. Also, subtraction circuit 322 can generate a difference signal 332 representing a difference between filtered audio signals 206*a* and 206*b* and feedback signals through resistors 350*b* and 352*b*, where the difference signal 332 can have an opposite polarity from the VN voltage (and feedback signal 330). Further, subtraction circuit 324 can generate another difference signal 334 representing a difference between signals 330 and 332. Signal combination circuit 325 can represent subtraction circuit 210 of FIG. 2, and difference signal 334 can represent difference signal 212 of FIG. 2. System 100 can also include a common mode regulator 327 coupled to driver inputs 302*a* and 302*b* to define a same input common mode voltage for driver inputs 302*a* and 302*b*.

Further, comparator 328 can generate control signals CS3 and CS4 by comparing difference signal 334 with a periodic ramp signal provided by periodic ramp generator 326 and modulating the duty cycle/pulse widths of CS3 and CS4 based on the difference. Periodic ramp generator 326 can receive a clock signal (labelled CLK) and generate the periodic ramp signal synchronized to the clock signal and having a cycle period defined based on the clock signal. Difference signal 334 can have a component representing the audio signals 206 and a corrective component representing the difference between VP and VN caused by, for example, the aforementioned asymmetry and non-linear effects. Accordingly, the duty cycle/pulse widths of CS3 and CS4 can reflect the instantaneous magnitudes of audio signals 206*a* and 206*b* (represented by difference signal 332) and a difference between VP and VN (as part of the master-slave configuration), and control circuit 204 can adjust CS3 and CS4 to reduce/minimize the difference between VP and VN.

Also, system 100 can also include a pair of resistor networks 350 and 352 to set an overall amplification gain of the system. The overall amplification gain can be between the differential output voltage VP−VN (or VY−VN) and the differential input voltage VINP−VINM. System 100 can include resistor network 350 for the signal path from VINP to VY, and resistor network 352 for the signal path from VINM to VN. Resistor network 350 can include an input resistor 350*a* coupled between audio input 306*a* and driver input 302*a*, and a feedback resistor 350*b* coupled between driver input 302*a* and output terminal 110. Also, resistor network 352 can include an input resistor 352*a* coupled between audio input 306*b* and driver input 302*b*, and a feedback resistor 352*b* coupled between driver input 302*b* and output terminal 108.

Resistor networks 350 and 352 are to be matched, where input resistors 350*a* and 352*a* have a same resistance (e.g., RIN) and feedback resistors 350*b* and 352*b* have a same resistance (e.g., RFB), to remove a component of differential output voltage VP−VN (or VY−VN) caused by the output common mode voltage VCM, and to provide an amplification gain for the differential input voltage VINP−VINM. For example, the following equation illustrates the effect of a mismatch between feedback resistors 350*b* and 352*b* (RMIS) on the differential output voltage VP−VN:

(Equation 1)

$$VP - VN = (VINP - VINM)\left(-\frac{RFB}{RIN}\right) + \left(\frac{2VCM}{1 + \frac{RIN}{RFB}}\right)\left(\frac{RMIS}{RFB}\right)$$

Referring to Equation 1, for a perfectly matched pair of resistor networks 350 and 352, RMIS is zero, and the amplification gain from the differential input voltage VINP−VINM to the differential output voltage VP−VN can be defined by the ratio between RFB and RIN. Such arrangement can provide a precise control of the overall gain of the audio system and improve linearity using negative feedback. However, if there is a mismatch between feedback resistors 350*b* and 352*b*, RMIS becomes non-zero, and the differential output voltage VP−VN can include a component caused by the output common mode voltage VCM. If the VCM includes a non-linear component, the non-linear component can leak into the differential output voltage VP−VN and cause harmonic distortion of the output audio, which can degrade the overall performance of the audio system.

Further, as described above, common mode regulator 327 can define a same input common mode voltage for driver inputs 302*a* and 302*b*, so that that input common mode voltage is absent in difference signals 332 and 334. But if there is mismatch between input resistors 350*a* and 352*a*, and/or common mode regulator 327 is absent or otherwise fails to define a same input common mode voltage for driver inputs 302*a* and 302*b*, there can be a common mode voltage difference between driver inputs 302*a* and 302*b*. That common mode voltage difference can also be present in difference signals 332 and 334 and in the differential output voltage VP−VN, which can also add harmonic distortion and degrade the overall performance of the audio system.

Figure 4:
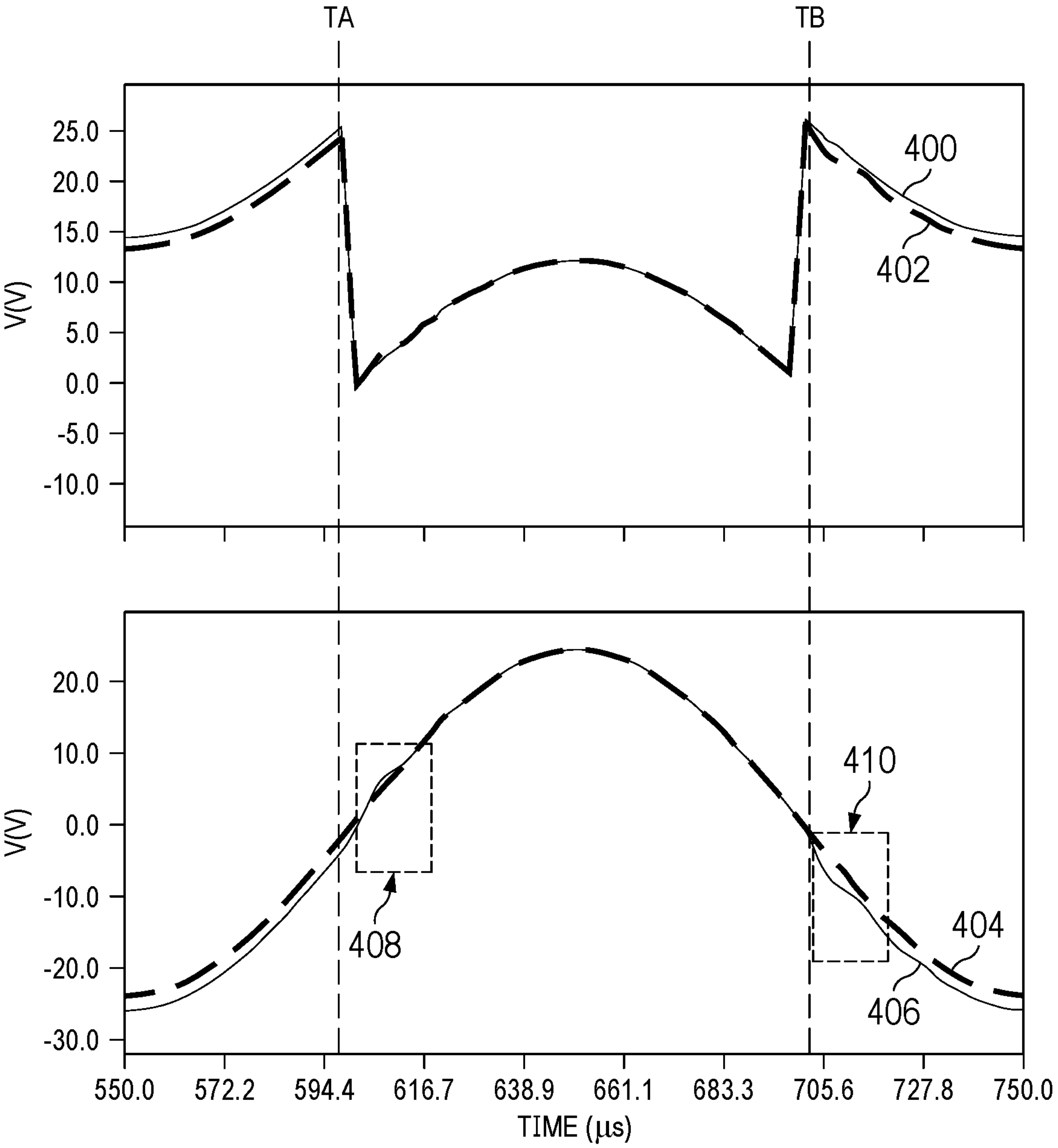
FIGS. 4 and 5 are graphs illustrating example effects of resistor mismatches.
Figure 5:
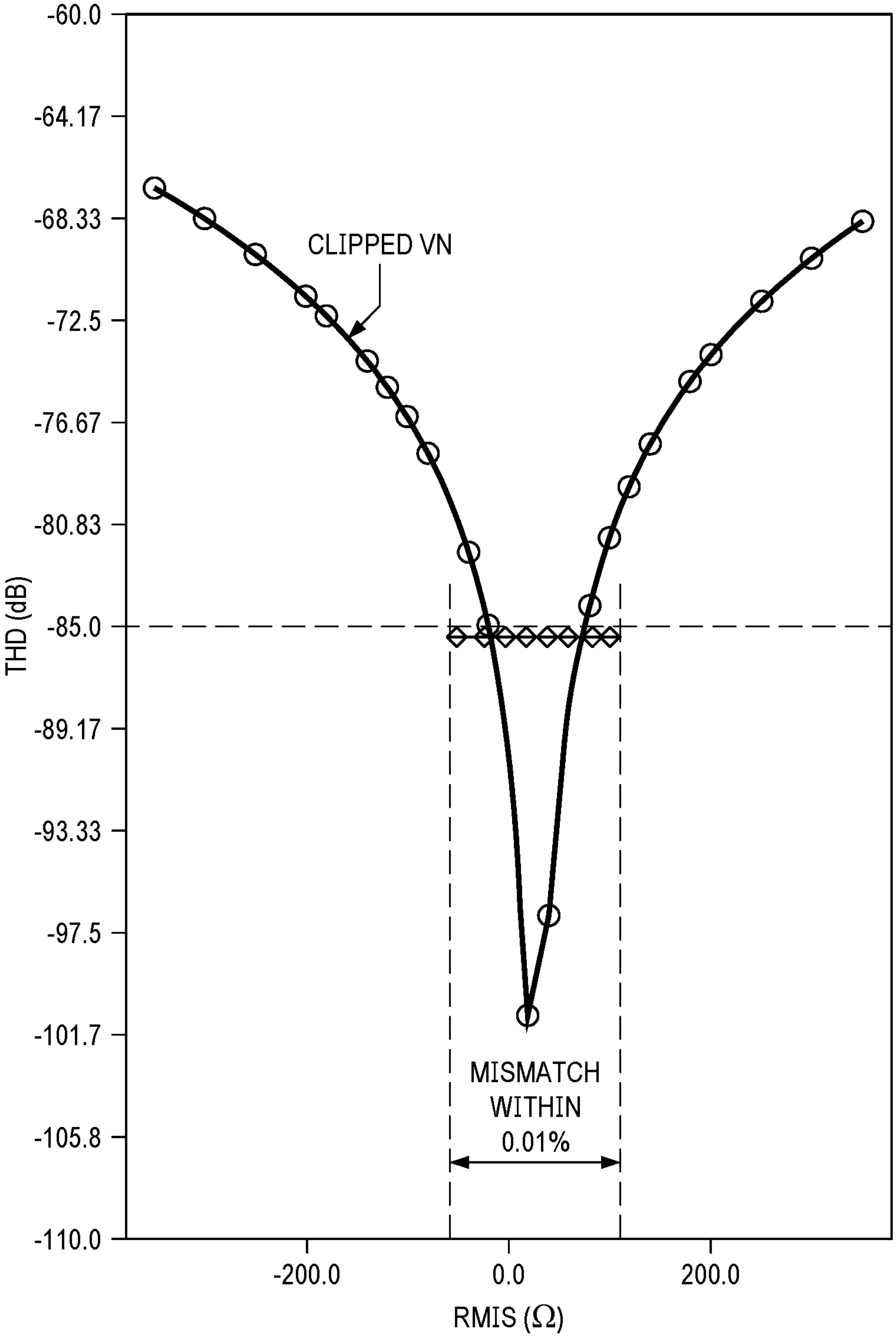

FIG. 4 and FIG. 5 are graphs that illustrate example effects of RMIS on the overall system performance. FIG. 4 includes graphs 400, 402, 404, and 406. Graph 400 illustrates an example variation of output common mode voltage VCM with time with matched feedback resistors (and zero RMIS), graph 402 illustrates an example variation of output common mode voltage VCM with time with 10% mismatched feedback resistors (and non-zero RMIS). Also, graph 404 illustrates an example variation of differential output voltage VP−VN with time with matched feedback resistors, and graph 406 illustrates an example variation of differential output voltage VP−VN with time with 10% mismatched feedback resistors.

Graphs 400, 402, 404, and 406 illustrate an operation condition where the first power stage PS1 operates in a saturation mode with matching input common mode voltages between driver inputs 302*a* and 302*b*, and the output voltage VN clips at PVDD. Accordingly, the output common mode voltage experiences abrupt transitions at times denoted by TA and TB. The common mode transients can be amplified by the feedback resistor mismatch, as illustrated in Equation 1. The master-slave configuration of audio system 100 may be unable to reduce the common mode transients, and the differential output voltage VP−VN may include harmonic components caused by the common mode transients and are non-linear with respect to the differential input voltages VINP−VINM, which are manifested as distortions 408 and 410 in FIG. 4.

The non-linear components can degrade the overall linearity of the audio system. FIG. 5 illustrates a graph 502, which illustrates an example variation of total harmonic distortion (THD) with respect to the degree of feedback resistor mismatch (RMIS) in a case where the first power stage PS1 operates in a saturation mode. Referring to graph 502, the THD is at a minimum of around −102 dB with zero RMIS. But as absolute RMIS increases (becomes more positive or negative), THD may increase to above −70 dB. To maintain the THD at about −85 dB, in some examples the feedback resistors can be matched to within, for example, 0.01%. In other examples, the feedback resistors can be matched to other percentages to achieve a THD of −85 dB or a different THD target.

Figure 6A:
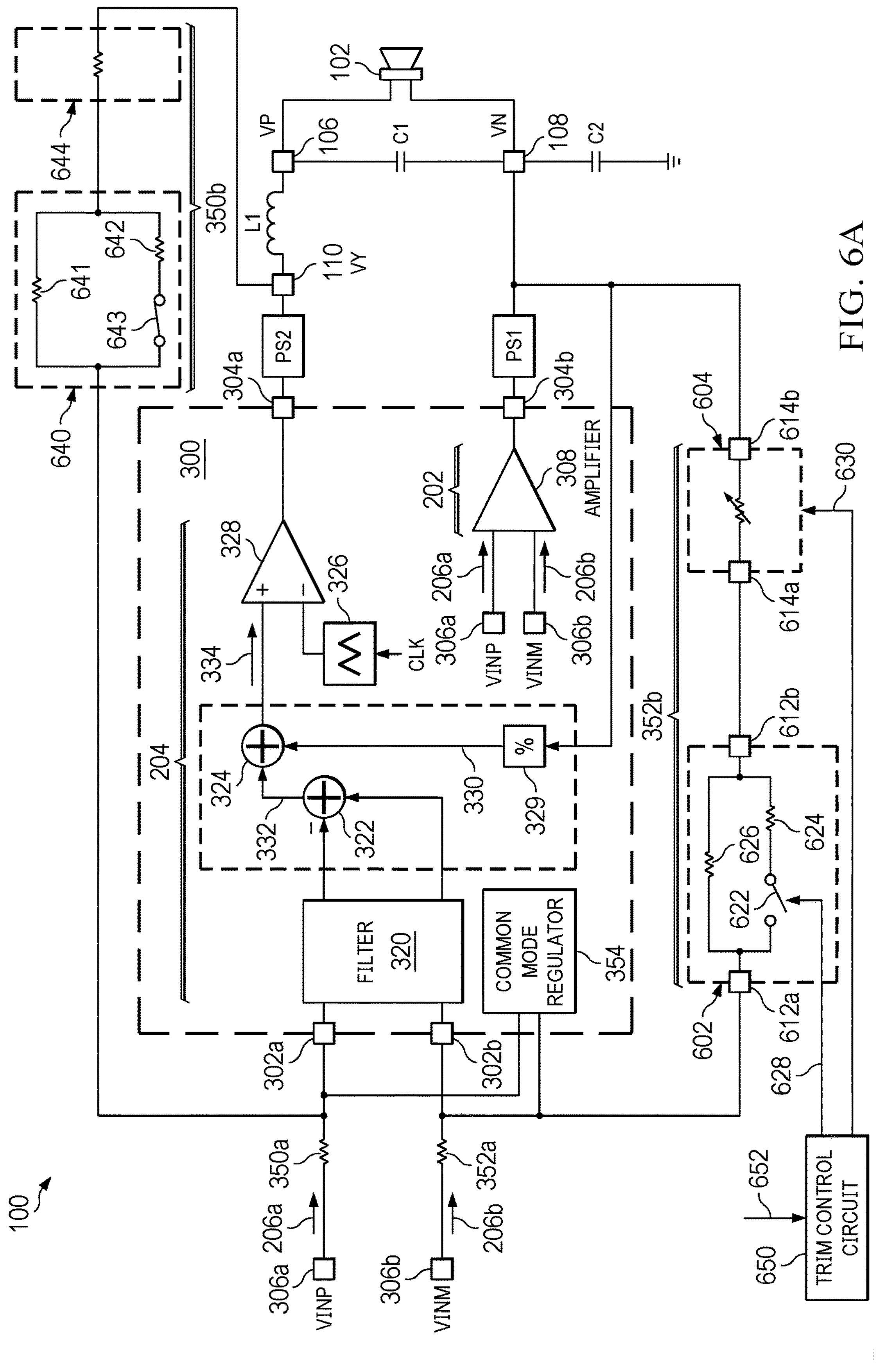
FIGS. 6A and 6B are schematics illustrating examples of an audio system including trimmable resistor networks.
Figure 6B:
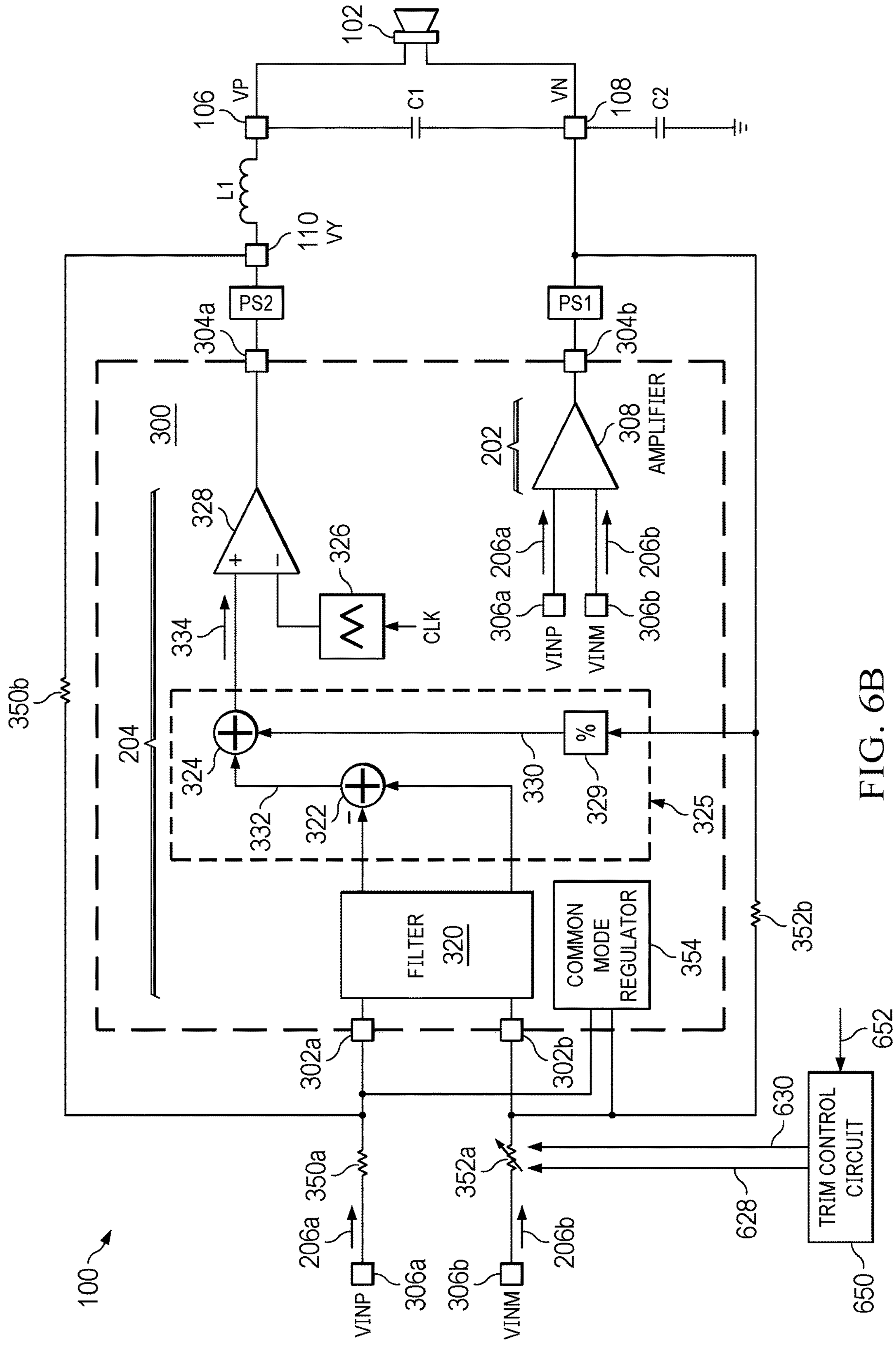

FIG. 6A and FIG. 6B illustrate examples of system 100 that can address at least some of the issues above. As shown in FIG. 6A, resistor network 352 can include one or more trimmable resistor networks, including a trimmable resistor network 602 as part of feedback resistor 352*b*. Some examples can also include a trimmable resistor network 604 as part of feedback resistor 352*b*. In some examples, audio driver circuit 300, power stages PS1 and PS2, and resistor networks 350 and 352 including the trimmable resistor networks can be part of an integrated circuit (IC).

Both trimmable resistor network 602 and trimmable resistor network 604 include resistors and switches to selectively connect/disconnect one or more resistors from the respective network to adjust the overall respective resistance of each resistor network. Specifically, trimmable resistor network 602 has terminals 612*a* and 612*b*, and includes multiple parallel segments coupled between terminals 612*a* and 612*b*. One segment of trimmable resistor network 602 includes a switch 622 and a resistor 624, and another segment of trimmable resistor network 602 includes a resistor 626 as an anchor. Switch 622 can be a p-channel transistor (e.g., PMOS, PFET, etc.), an n-channel transistor (e.g., NMOS, NFET, etc.), or a p-channel transistor and an n-channel transistor coupled in parallel. To reduce area and to reduce parasitic capacitances (e.g., gate-drain capacitance, gate-source capacitance, etc.) which can inject charge during switching and introduce error in trimming, the transistor(s) of switch 622 have a lower voltage tolerance than the transistors of other circuits of system 100, such as power stages PS1 and PS2. For example, the transistor(s) of switch 622 can tolerate up to 1.5 or 1.8V, while the transistors of power stages PS1 and PS2 can tolerate up to 5V or higher.

As to be described below, switch 622 has a control terminal to receive a modulated signal 628, which can repeatedly turn on/off switch 622 to connect/disconnect resistor 624 from terminals 612*a*, which changes the overall resistance of trimmable resistor network 602 between terminals 612*a* and 612*b*. The average resistance of trimmable resistor network 602 can be controlled through the duration of turning on/off switch 622, and the averaging of the resistance can be performed by filter 320, which can have a much lower 3 dB frequency than the switching frequency of switch 622. Accordingly, through controlling the timing property of modulated signal 628 (e.g., duty cycle, pulse width, etc.) and the duration of turning on (or off) switch 622, the average resistance of trimmable resistor network 602 across multiple cycles of modulated signal 628 can be set. Because the timing property of modulated signal 628 can be set at a relatively high precision, the resolution/precision in setting the resistance of trimmable resistor network 602 can also be high. This allows trimmable resistor network 602 to have a small area compared with trimmable resistor network 604, or other trimmable resistor network that does not rely on switching for trimming/matching. Further, regular poly resistors (or other resistors made using inexpensive processes) can be used to implement the trimmable and non-trimmable resistor networks, which can reduce cost and manufacturing complexity while allowing improved matching between the resistors. On the other hand, the precision in setting the duty cycle/pulse width can be at the highest within a middle range of duty cycle/pulse width (e.g., 40-60% duty cycle) and can reduce towards the extremes (e.g., 0% and 100% duty cycles). Accordingly, trimmable resistor network 602 can be used for a relatively narrow range trimming of the resistance with a high resolution.

Figure 7B:
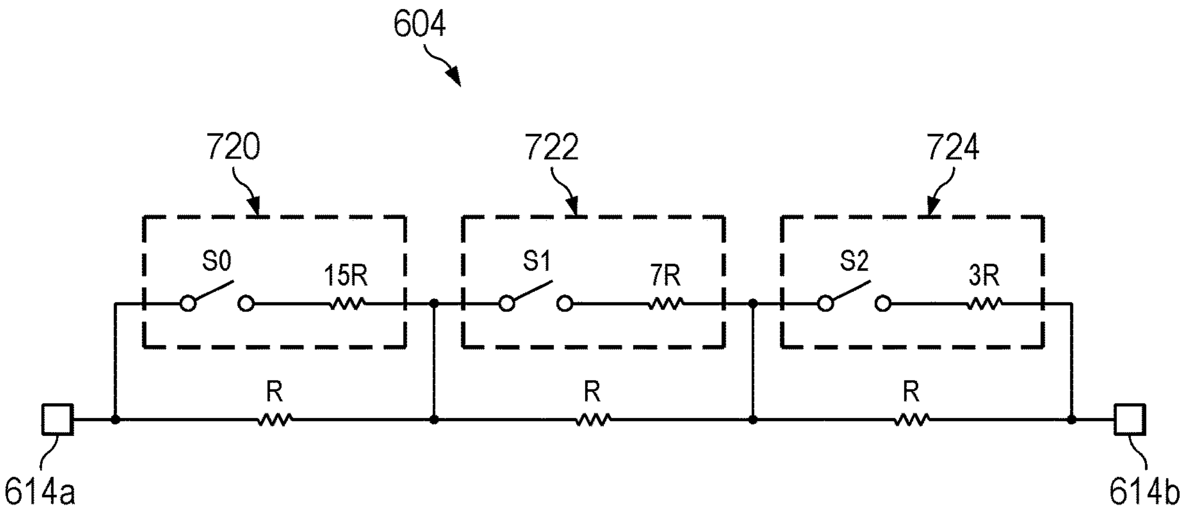

Also, trimmable resistor network 604 can receive a set of static signals 630 to provide coarse adjustment of the resistance. FIG. 7A and FIG. 7B are schematics illustrating examples of trimmable resistor network 604 and tables 702 (FIG. 7A) and 704 (FIG. 7B) illustrating example trim ranges and resolutions for each example of trimmable resistor network 604. Trimmable resistor network 604 has terminals 614*a* and 614*b*. Trimmable resistor network 604 can include an anchor resistor having resistance R and multiple switchable segments coupled between terminals 614*a* and 614*b*, such as segments 712, 714, 706, 708, 710, 712, and 714 of FIG. 7A, and segments 720, 722, and 724 of FIG. 7B. The resistors of different segments can have different resistances and can be weighted/scaled to achieve a particular trim resolution. The example shown in FIG. 7B, however, can have a smaller area than the example shown in FIG. 7A for a same trim resolution.

Each switch of a segment of trimmable resistor network 604 can be a p-channel transistor, an n-channel transistor, or a parallel combination of both. Each switch has a control terminal and can individually receive a static signal of the set of static signals. Depending on the logical state of the static signal, the switch can be turned on/off, which can connect/disconnect the resistor of the segment from one of terminals 614*a* or 614*b* to trim/adjust the overall resistance of resistor network 604. The logical state of each of static signals 630 can remain static over an extended period of time (e.g., throughout the entire time when system 100 is power on), and the overall resistance of trimmable resistor network 604 can be changed by changing the subset of the segments connected to terminals 614*a* and/or 614*b*. The examples of resistor network 604 of FIG. 7A and FIG. 7B include a larger number of switchable segments than resistor network 602 to achieve a particular trim resolution, and have a larger area than resistor network 602. The example shown in FIG. 7B, however, can have a smaller area than the example shown in FIG. 7A. Accordingly, in some examples, resistor network 604, such as examples shown in FIGS. 7A and 7B, can be used to provide a coarse adjustment of overall resistance of resistors 352*b*/352*a* to a particular range, and resistor network 602 can be used to provide a fine adjustment of the overall resistance of resistors 352*b*/352*a* around that particular range to match with resistors 350*b*/350*a*. The coarse and fine adjustments can be performed sequentially or at the same time.

Referring back to FIG. 6B, in some examples, resistor network 352 can also include one or more trimmable input resistor 352*a*, which can include at least one of trimmable resistor networks 602 or 604, to adjust the input common mode voltage of driver input 302*b* to match with driver input 302*a*. Such arrangements can reduce the input common mode voltage difference between driver inputs 302*a* and 302*b* due to, for example, absence of common mode regulator 354, or limited precision of common mode regulator 354 in setting the input common mode voltages at driver inputs 302*a* and 302*b*.

In both of FIG. 6A and FIG. 6B, resistor network 350 can be non-trimmable. For example, resistor network 350 (e.g., input resistor 352*a*, feedback resistor 352*b*) may include a resistor network 640 including resistors 641 and 642 matching, respectively, resistors 624 and 626, and a resistor network 644 including multiple segments. Both of resistor networks 640 and 644 may not include switches or, as shown in in FIG. 6A, may include dummy switches that are always switched on to match with the switches in resistor network 352. For example, resistor network 640 may include a dummy switch 643 in series with resistor 642 to mirror switch 622 and to allow resistor network 640 to match with resistor 602 across different processes, voltages, and temperatures. Not switching/trimming resistors 640 and 644 can reduce potential stress on the switches caused by the modulated output voltage VY, which switches at a much higher frequency than the linear output voltage VX that largely follows the audio signal. Such arrangements can improve the reliability of the resistor networks.

System 100 may also include a trim control circuit 650 to provide modulated signal 628 and static signals 630. Trim control circuit 650 can be part of the IC that includes audio driver circuit 300, power stages PS1 and PS2, and resistor networks 350 and 352. Trim control circuit 650 can receive a control signal 652, and generate modulated signal 628 and static signals 630 based on control signal 652. Control signal 652 can include a first trim code representing the duty cycle/pulse width of modulated signal 628 targeted at trimmable resistor network 602, and a second trim code indicating which segment(s) to be connected/disconnected from terminals 614*a/b* to be represented by static signals 630. In some examples, control signal 652 can represent programming data received from an external source (e.g., from a communication interface, from another controller, etc.). In some examples, as to be described below, system 100 can include a calibration circuit that can perform a self-calibration operation to determine the first trim code and the second trim code, and provide control signal 652 representing the first and second trim codes to trim control circuit 650.

Figure 8:
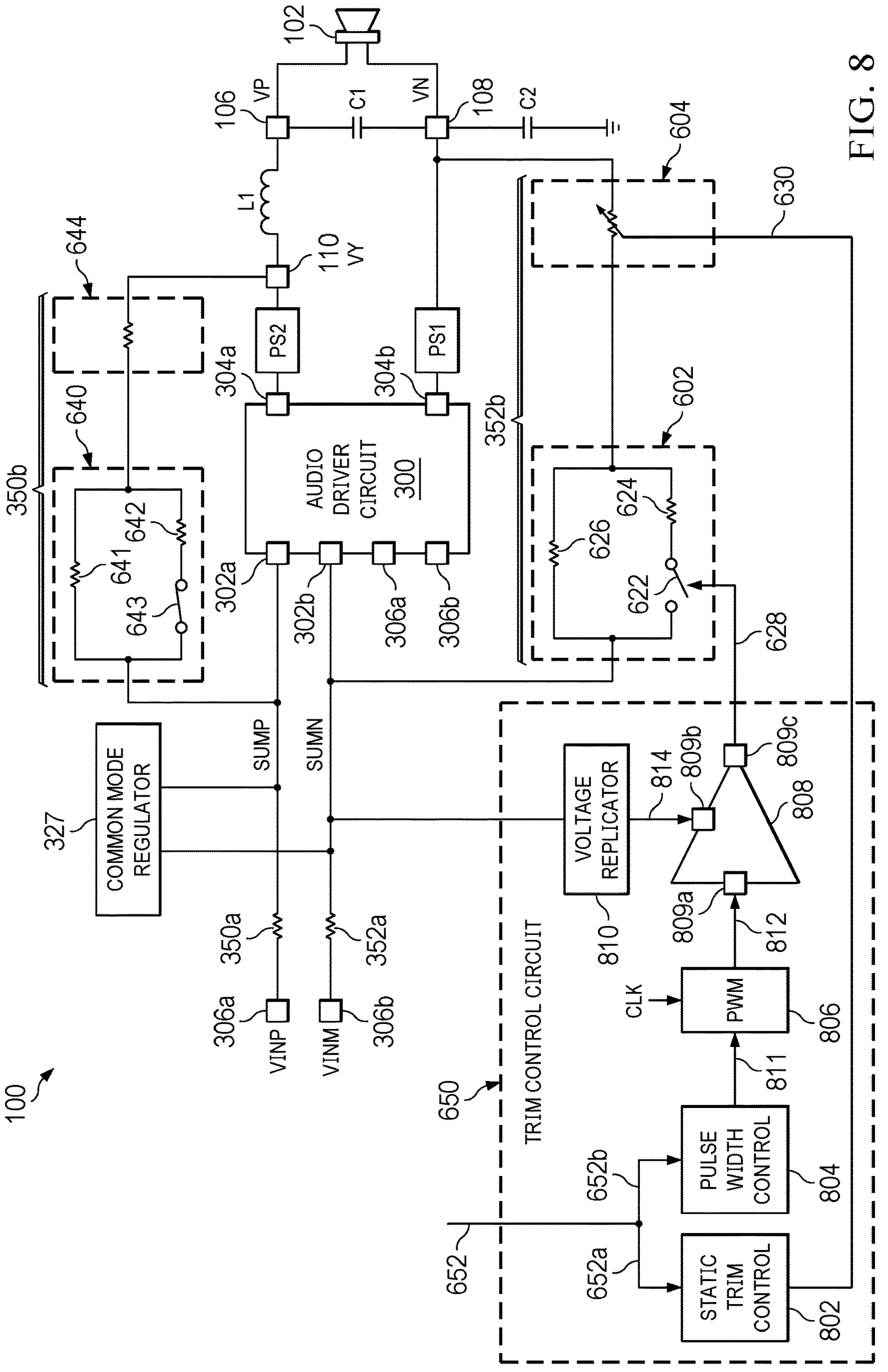
FIG. 8 is a schematic illustrating examples of internal components of a trim control circuit.

FIG. 8 illustrates examples of internal components of trim control circuit 650 and system 100 to support a self-calibration operation. Referring to FIG. 8, trim control circuit 650 can include a static trim control circuit 802, a pulse width control circuit 804, a modulator circuit, such as a pulse width modulator (PWM) circuit 806, a modulator buffer 808, and a voltage replicator circuit 810. Static trim control circuit 802 can receive a static trim code 652*a* from control signal 652, and generate static control signals 630 from static trim code 652*a*. Based on static trim code 652*a*, static trim control circuit 802 can generate a control signal having a particular logical state to enable or disable the switch for each segment of trimmable resistor network 604, and collectively transmit the control signals as static control signals 630 to trimmable resistor network 604.

Also, pulse width control circuit 804, PWM circuit 806, and modulator buffer 808 can generate modulated signal 628 for trimmable resistor network 602. Specifically, pulse width control circuit 804 can receive a pulse width trim code 652*b* from control signal 652, and generate a control signal 811 representing a pulse width/duty cycle of modulated signal 628. PWM circuit 806 can generate a modulated signal 812 having a pulse width/duty cycle based on control signal 811. In some examples, PWM circuit 806 can also include a periodic ramp generator and a comparator similar to control circuit 204, where the comparator can generate modulated signal 812 by comparing the periodic ramp signal with a threshold voltage, and PWM circuit 806 can vary the threshold voltage based on control signal 811 to set the pulse width. PWM circuit 806 can also receive the same clock signal (CLK) as periodic ramp generator 326 of control circuit 204 and generate modulated signal 812 based on the clock signal, so that modulated signal 812 can be synchronized with the modulated control signals CS3 and CS4 provided by control circuit 204 to the power stage PS2.

Further, modulator buffer 808 can include a buffer input 809*a*, a bias input 809*b*, and a buffer output 809*c*. Modulator buffer 808 can receive modulated signal 812 from PWM circuit 806 at buffer input 809*a* and a bias voltage 814 at bias input 809*b*, and provide modulated signal 628 at buffer output 809*c* as a buffered version of modulated signal 812. Modulated signal 628 can have the same logical state as modulated signal 812 but with reduced voltage swing and reduced slew rate, and modulator buffer 808 can set the voltage swing of modulated signal 628 based on bias voltage 814. The reduced voltage swing and reduced slew rate of modulated signal 628 can reduce parasitic charge injection by switch 622 during switching to improve the accuracy of the trimming operation.

For example, modulated signal 812 can have a voltage swing between 0 and 5V (e.g., based on the voltage supply to PWM circuit 806). On the other hand, modulated signal 812 can have a reduced voltage swing between a first voltage and a second voltage. Modulator buffer 808 can receive bias voltage 814 representing an instantaneous voltage at the driver input 302*b*, labelled SUMN in FIG. 8, from voltage replicator circuit 810, which can include a voltage follower. Modulator buffer 808 can set the first voltage (V1) at SUMN, which is also a voltage at a current terminal (drain/source) of a transistor of switch 622. Modulator buffer 808 can set the second voltage (V2) by adding (or subtracting) a sum of a threshold voltage of the transistor of switch 622 and an overdrive voltage to (or from) the first voltage V1. The second voltage V2 is designed to turn on the transistor of switch 622 and set a particular on-resistance (RDS-on) of the transistor. For example, in a case where switch 622 includes a p-channel transistor, V2 can be lower than V1 (SUMN) by the threshold voltage of the p-channel transistor (Vtp) and overdrive voltage (VOV), as follows:

$$V2 = SUMN - Vtp - VOV \quad \text{(Equation 2)}$$

Also, in a case where switch 622 includes an n-channel transistor, V2 can be higher than V1 (SUMN) by the threshold voltage of the n-channel transistor (Vtn) and overdrive voltage (VOV), as follows:

$$V2 = SUMN + Vtn + VOV \quad \text{(Equation 3)}$$

The sum of the threshold voltage and the overdrive voltage can be much smaller than 5V (the voltage swing of modulated signal 812). The slew rate can also be reduced due to additional capacitive loading at the output of modulator buffer 808. With such arrangements, the voltage swing and slew rate of modulated signal 628 can be reduced, which can reduce charge injection by switch 622 during the switching. As explained above, the charge injection can affect the accuracy of trimming. Also, the charge injection can add to the current conducted by resistor network 602, which can represent an extra resistive element (or a less resistive element) contribution to resistor network 602. The current can be non-linear, which can have similar effect as leaking the non-linear common mode voltage into the differential output voltage VP−VN, which in turn can lead to THD degradation. Accordingly, by reducing the voltage swing and slew rate of modulated signal 628, the charge injection and harmonic distortion caused by the switching of resistor network 602 can be reduced.

In addition, modulator buffer 808 can set the overdrive voltage OV as a temperature-compensated voltage, to reduce the variation of OV with respect to temperature. Such arrangements can reduce the variation of the on-resistance of switch 622 with temperature, which can reduce the mismatch between resistor networks 350 and 352 caused by temperature changes. In examples where resistor network 640 includes dummy switch 643, the mismatch can be further reduced due to dummy switch 643 tracking the on-resistance of switch 622 across various processes, voltages, and temperatures.

Figure 9A:
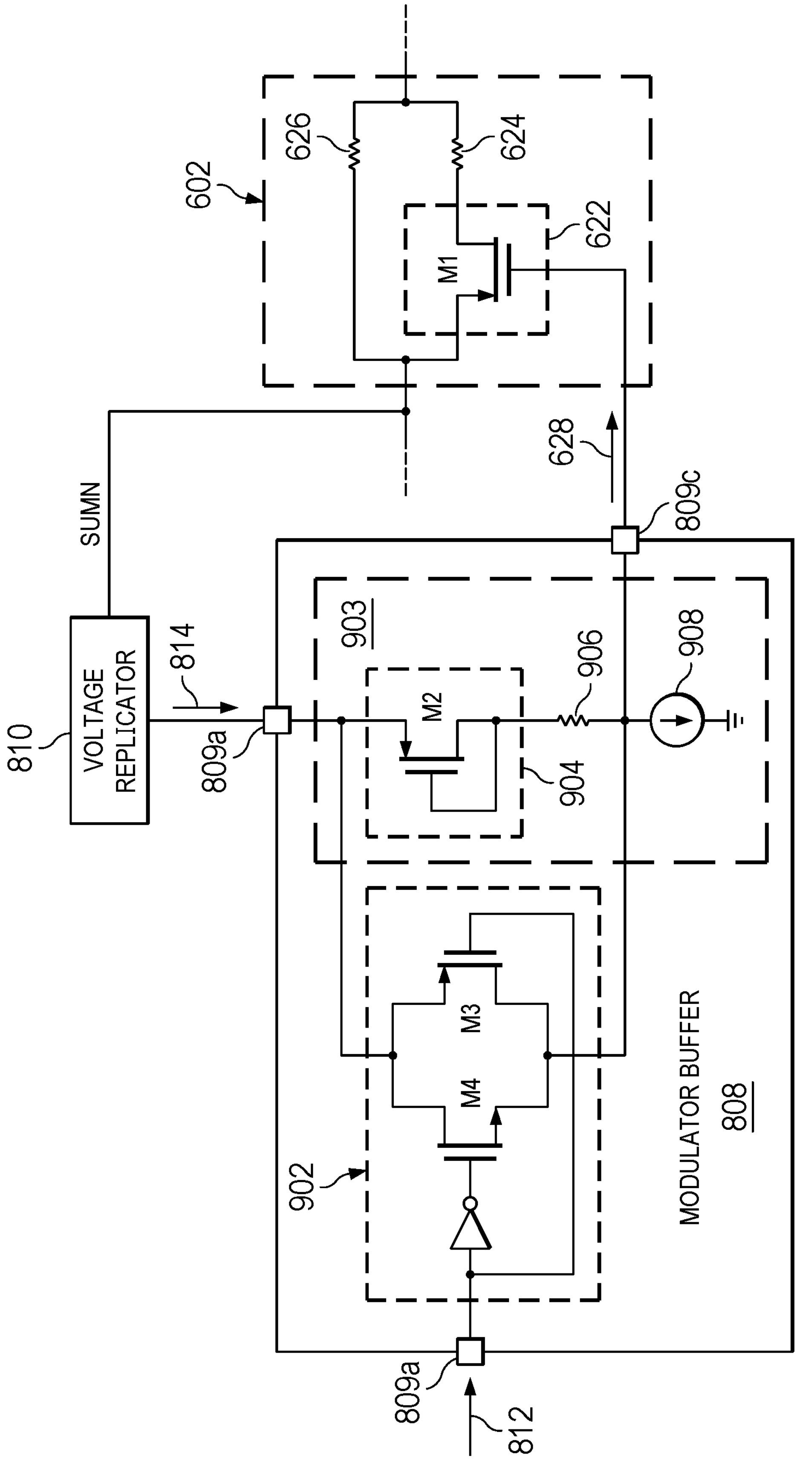
FIGS. 9A and 9B are schematics illustrating examples of internal components of the trim control circuit of FIG. 8.
Figure 9B:
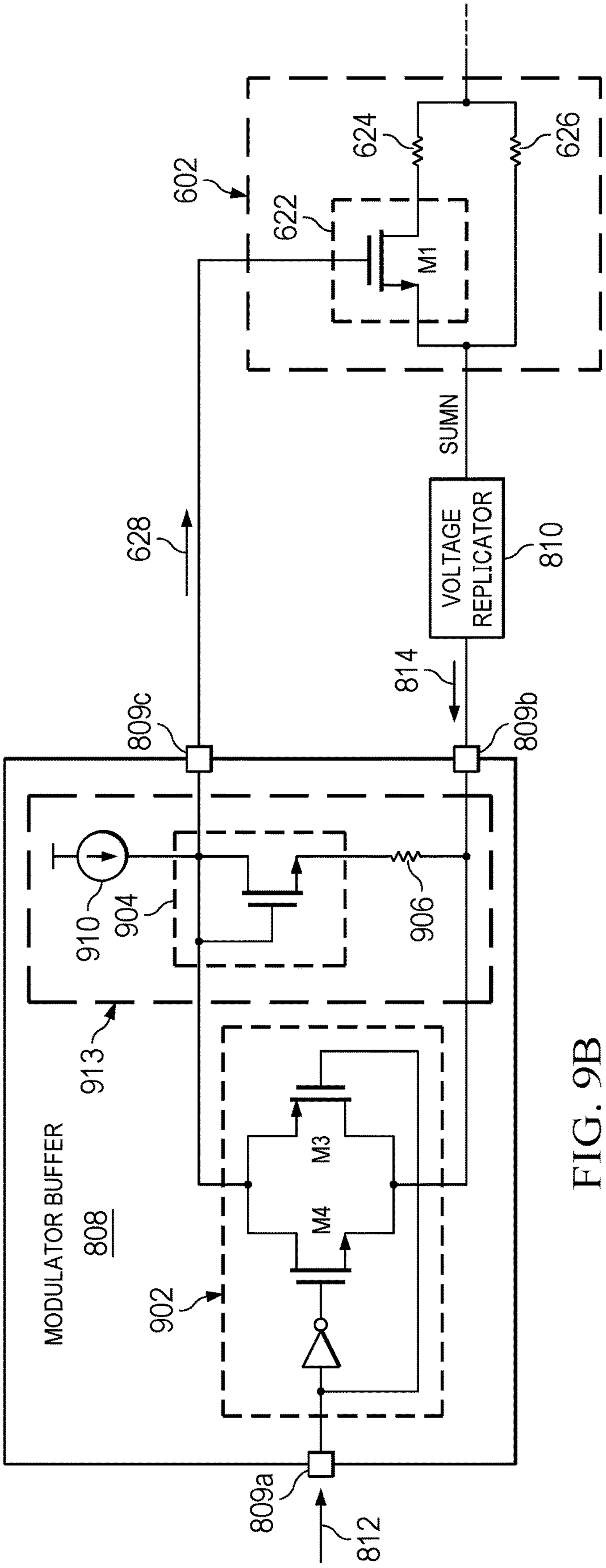

FIG. 9A and FIG. 9B illustrate examples of internal components of modulator buffer 808. Referring to FIG. 9A, modulator buffer 808 includes a transmission gate 902 coupled between bias input 809*b* and buffer output 809*c*. Modulator buffer 808 also includes a bias generation circuit 903 including a threshold voltage tracker circuit 904 and a resistor 906 coupled between bias input 809*b* and buffer output 809*c*, and a current source 908 coupled between resistor 906 and ground. In FIG. 9B, modulator buffer 808 also includes a bias generation circuit 913 including a current source 910 coupled between a voltage supply and threshold voltage tracker circuit 904, and resistor 906. Both current sources 908 and 910 can generate a reference current representing a ratio between a bandgap reference voltage and the resistance of a reference resistor that tracks the resistance of resistor 906.

Threshold voltage tracker circuit 904 and resistor 906, in combination of current sources 908 and/or 910, can set the second voltage (V2) of modulated signal 812 relative to the first voltage (V1) of modulated signal 812, which is provided by voltage 814 from voltage replicator circuit 810 and follows the SUMN voltage. Specifically, threshold voltage tracker circuit 904 includes a diode-connected transistor having the same type as the transistor of switch 622 and introduces a voltage drop/increase that tracks the threshold voltage of the transistor of switch 622. In FIG. 9A both switch 622 and threshold voltage tracker circuit 904 include a PFET (e.g., a PMOS), and in FIG. 9B both switch 622 and threshold voltage tracker circuit 904 include an NFET (e.g., an NMOS). Also, resistor 906, together with current sources 908 and/or 910, can define the overdrive voltage OV. Both current sources 908 and 910 can generate a reference current representing a ratio between a bandgap reference voltage and the resistance of a reference resistor tracks the resistance of resistor 906 (e.g., having similar/same temperature coefficient as resistor 906), and the reference current flows through resistor 906 to generate the overdrive voltage OV across resistor 906. Because the bandgap reference voltage has very little variation across temperature, while the temperature coefficients of the resistor 906 and the reference resistor can cancel out, the resulting overdrive voltage OV can also have very little variation across temperature. As described above, such arrangements can reduce the variation of on-resistance switch 622 across temperatures, which can reduce the mismatch between resistor networks 350 and 352 caused by temperature changes. In FIG. 9A, modulator buffer 808 generates the second voltage V2 by introducing a voltage drop of a sum of Vtp and VOV from SUMN to turn on the PFET of switch 622, while in FIG. 9B, modulator buffer 808 generates the second voltage V2 by introducing a voltage increase of a sum of Vtn and VOV from SUMN to turn on the NFET of switch 622.

Also, transmission gate 902 can include transistors M3 and M4 and can selectively forward the first voltage (SUMN) or the second voltage (SUMN−Vtp−VOV for PFET, SUMN+Vtn+VOV for NFET) as modulated signal 628, depending on the state of modulated signal 812. Transmission gate 902, together with threshold voltage tracker 904 and resistor 906, also operate as a level shifter to change the voltage levels of modulated signal 628 with respect to modulated signal 812, to reduce the voltage swing and slew rate.

In examples where resistor network 602 includes dummy switch 643, system 100 can include a replica of bias generator 903 to provide a bias voltage to maintain dummy switch 643 in an always-on state, if dummy switch 643 is a PFET. System 100 can also include a replica of bias generator 913 to provide a bias voltage to maintain dummy switch 643 in an always-on state, if dummy switch 643 is an NFET.

Figure 10:
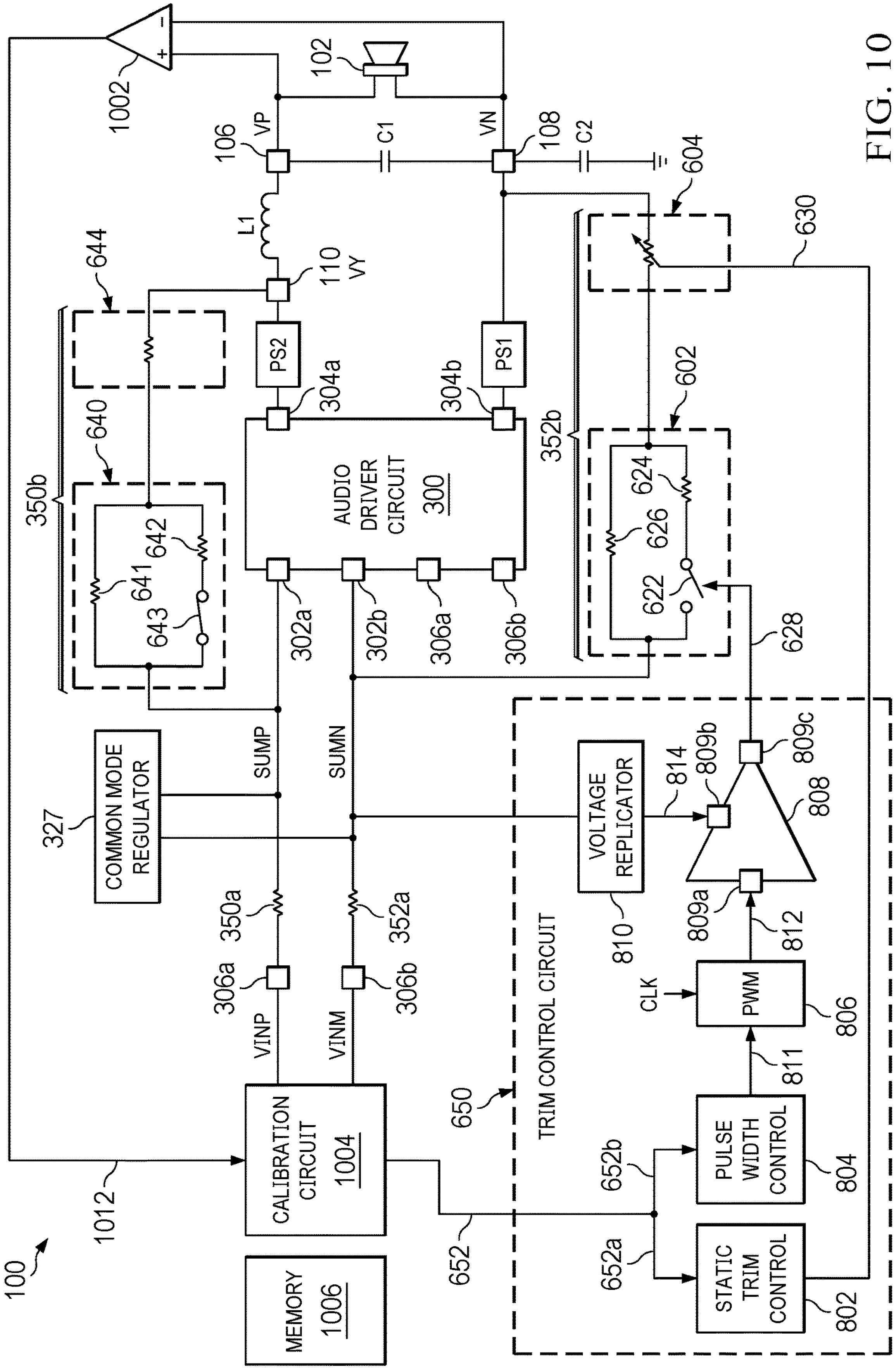
FIG. 10 is a schematic illustrating examples of an audio system including trimmable resistor networks and a calibration circuit.

In some examples, system 100 can include additional circuits to perform a self-calibration operation to determine the trim codes for trimmable resistor networks 602 and/or 604. FIG. 10 illustrates examples of internal components of system 100 to support the self-calibration operation. In some examples, system 100 can perform the self-calibration operation as part of a factory calibration operation before system 100 is packaged/shipped. In some examples, system 100 can perform the self-calibration operation periodically or responsive to a change in the operation condition (e.g., during power up, experiencing change in temperature, etc.) to account for resistance drifting of the resistors.

Referring to FIG. 10, in some examples, system 100 can include a differential amplifier 1002, a calibration circuit 1004, and memory 1006. Differential amplifier 1002 can be on the same chip as audio driver circuit 300, trim control circuit 650, and resistor networks 350 and 352, or can be external to the chip (e.g., on a system motherboard). In the example shown in FIG. 10, the positive and negative inputs of differential amplifier 1002 are coupled to terminals 106 and 108 (or 110), and generate a signal 1012 representing a voltage difference VP−VN to support the calibration/trimming of feedback resistor 352*b*. In other examples, the positive and negative inputs of differential amplifier 1002 are coupled to driver inputs 302*a* and 302*b*, and differential amplifier 1002 can generate signal 1012 representing a voltage difference SUMP−SUMN to support the calibration/trimming of input resistor 352*a*.

Figure 11:
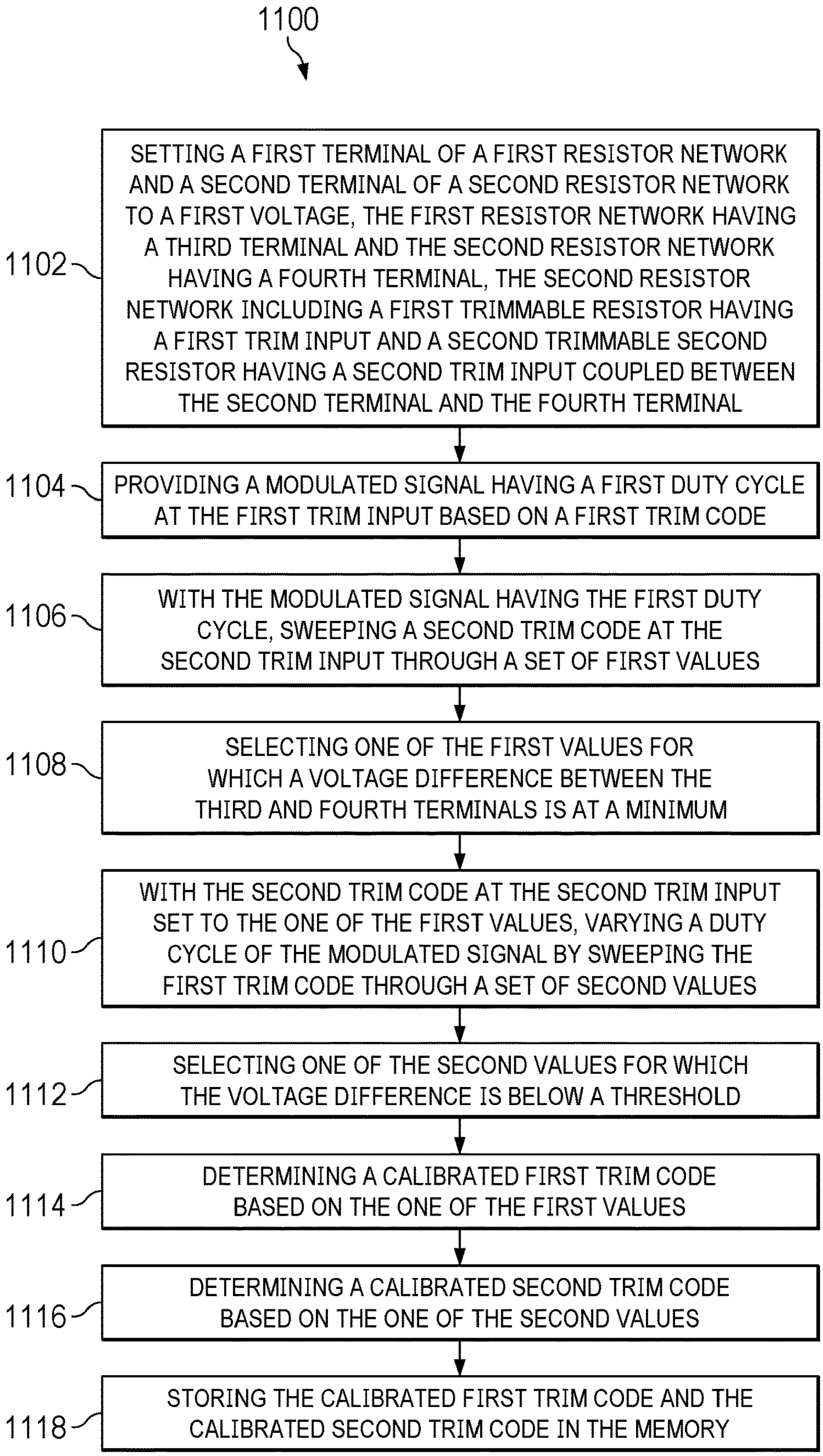
FIG. 11 is a flowchart illustrating examples of a calibration operation.

Calibration circuit 1004 has outputs coupled to audio inputs 306*a* and 306*b*, an input coupled to the output of differential amplifier 1002, and a control output coupled to trim control circuit 650 to provide control signal 652. During calibration, common mode regulator 327 can be disabled, and calibration circuit 1004 can set audio inputs 306*a* and 306*b* to have a same voltage, so that VINP−VINM is zero. Calibration circuit 1004 can generate static trim code 652*a* and pulse width trim code 652*b* based on signal 1012. FIG. 11 illustrates a flowchart of a method 1100 that can be performed by calibration circuit 1004 to generate static trim code 652*a* and pulse width trim code 652*b*. Referring to FIG. 11, in operation 1102, calibration circuit 1004 sets a first terminal of a first resistor network (e.g., resistor network 350) and a second terminal of a second resistor network (e.g., resistor network 352) to a common first voltage. For calibrating feedback resistor 352*b*, the first and second terminals can be at or coupled to audio inputs 306*a* and 306*b*. The first resistor network has a third terminal and the second resistor network has a fourth terminal. For calibrating input resistor 352*a*, the third and fourth terminals can be at or coupled to driver inputs 302*a* and 302*b*. For calibrating feedback resistor 352*b*, the third and fourth terminals can be at or coupled to terminals 110/106 and 108. The second resistor network has a first trim input (to receive modulated signal 628) and second trim inputs (to receive static signals 630).

In operation 1104, calibration circuit 1004 can provide a modulated signal (e.g., modulated signal 628) having a first duty cycle at the first trim input based on a first trim code. Specifically, calibration circuit 1004 can set an initial pulse width trim code, and provide the initial pulse width trim code as part of control signal 652 to trim control circuit 650, which sets the pulse width of modulated signal 628. In some examples, the initial pulse width trim code can represent a minimum pulse width/duty cycle of modulated signal 628 (within a range of pulse widths/duty cycles) to be provided by trim control circuit 650.

In operation 1106, with the modulated signal having the first duty cycle, calibration circuit 1004 can sweep a second trim code (e.g., the static trim code) at the second trim input through a set of first values. The set of first values can be retrieved from memory 1006. Calibration circuit 1004 can also include receive signal 1012 from differential amplifier 1002 representing a voltage difference between the third and fourth terminals, digitize the voltage difference, and store the digital representations of the voltage difference for each of the first set of values of the second trim code in memory 1006.

In operation 1108, calibration circuit 1004 can select one of the first values for which the voltage difference is at a minimum, based on the data stored in memory 1006.

In operation 1110, calibration circuit 1004 can set the second trim code based on the selected one of the first values, and provide the second trim code as part of control signal 652 to trim control circuit 650. The second trim code can be selected to, for example, limit the range of duty cycle/pulse widths of the modulated signal 628. Calibration circuit 1004 can vary a duty cycle of the modulated signal by sweeping the first trim code (e.g., the pulse width trim code) through a set of second values. The set of second values can be retrieved from memory 1006 and can further limit the range of duty cycle/pulse widths of the modulated signal 628. Calibration circuit 1004 can also include receive signal 1012 from differential amplifier 1002 representing a voltage difference between the third and fourth terminals, digitize the voltage difference, and store the digital representations of the voltage difference for each of the second set of values of the first trim code in memory 1006.

In operation 1112, calibration circuit 1004 can select one of the second values for which the voltage difference is below a threshold. In operation 1114, calibration circuit 1004 can determine a calibrated first trim code (e.g., a calibrated static trim code) based on the one of the first values. Also, in operation 1116, calibration circuit 1004 can determine a calibrated second trim code (e.g., a calibrated pulse width trim code) based on the one of the second values. And then in operation 1118, calibration circuit 1004 can store the calibrated first trim code and the calibrated second trim code in memory 1006, and the calibration operation ends. Calibration circuit 1004 can then retrieve the calibrated trim codes and provide the calibrated trim codes to trim control circuit 650.

In some examples, calibration circuit 1004 can repeat method 1100 so that trim code 652*b* at operation 1114 does not generate an extreme duty cycle, or the duty cycle of modulated signal 812 falls within a target range. Examples of an extreme duty cycle can include 1%, 2%, 3%, 4%, 5%, 95%, 96%, 97%, 98%, 99%, etc.

Figure 12:
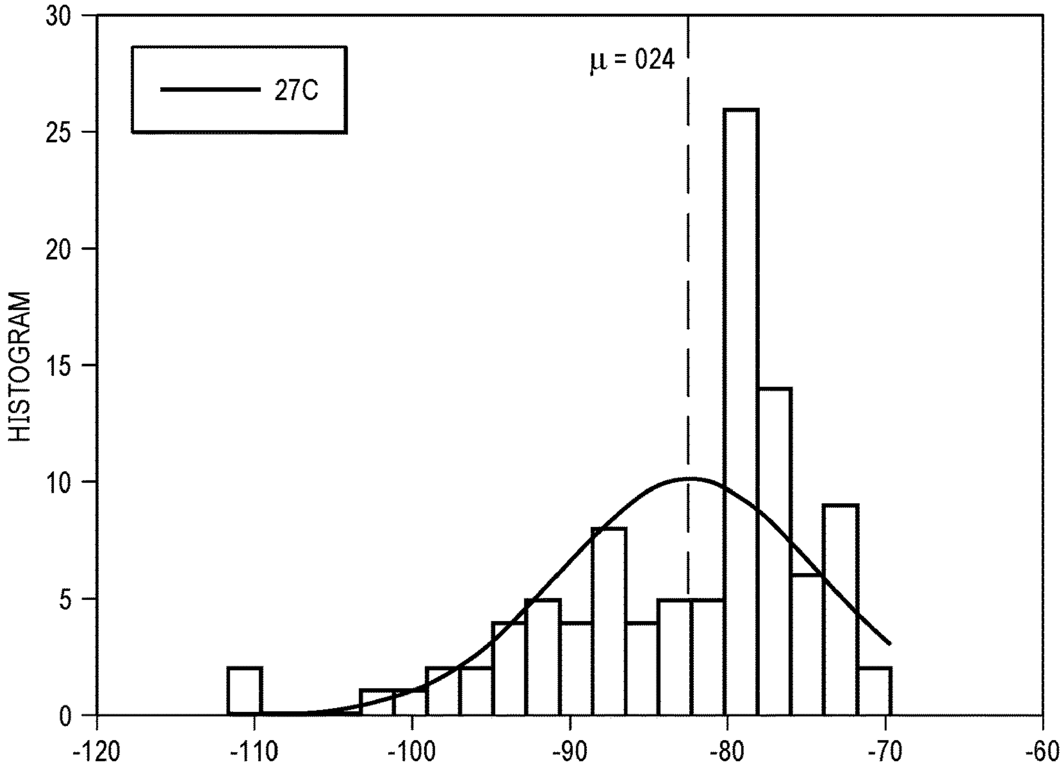
FIG. 12 are graphs illustrating example effects of trimming the resistors of an audio system.
Figure 12:
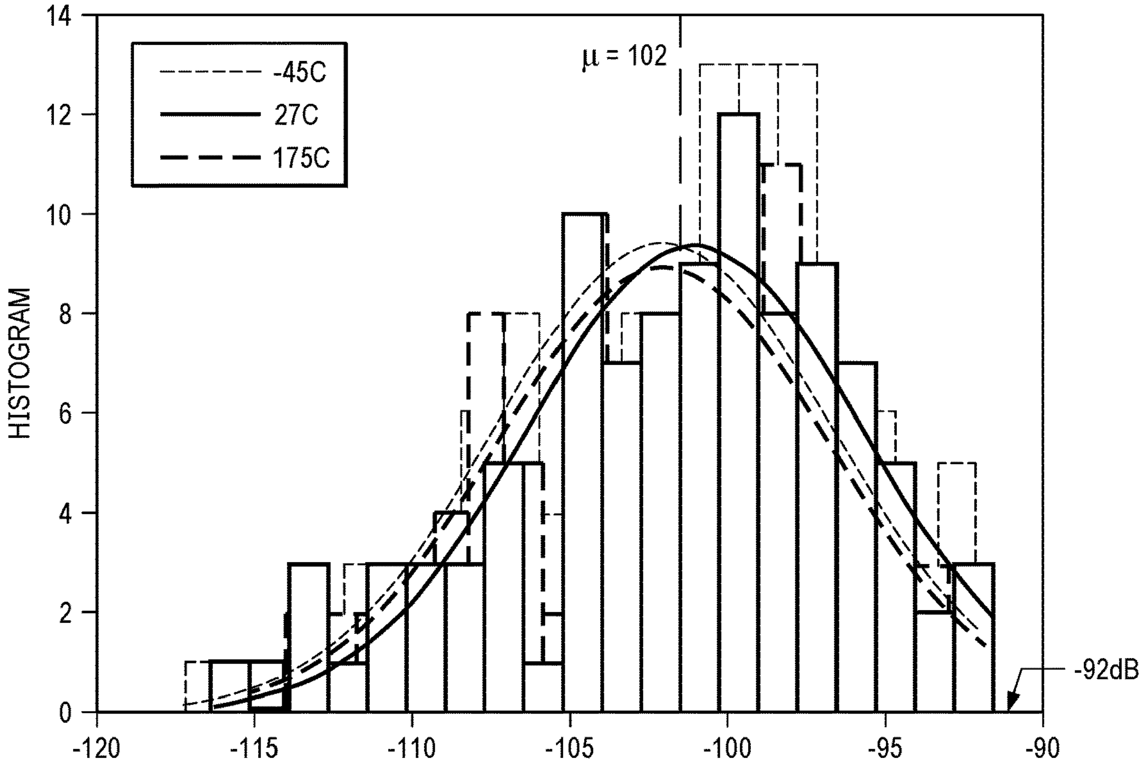

FIG. 12 includes graphs that illustrate example effect of calibration/trimming of resistor network 352 on THD reduction. FIG. 12 includes graphs 1200 and 1202. Graph 1200 include a histogram of example distribution of THD without calibration/trimming at a temperature of 27 C, and graph 1202 includes histograms of example distributions of THD with calibration/trimming operation at 27 C, and operations at temperatures of −45 C, 27 C, and 175 C. As shown in graphs 1200 and 1202, without calibration/trimming, the THD can range from −70 dB to −110 dB, and with calibration/trimming, the THD can range from −92 dB to −117 dB across temperatures −45 C, 27 C, and 175 C. Accordingly, by calibrating/trimming resistor 352, THD can be substantially improved (by 20 dB). Robustness is also improved, because the THD can be substantially improved across a wide range of temperatures.

Figure 13:
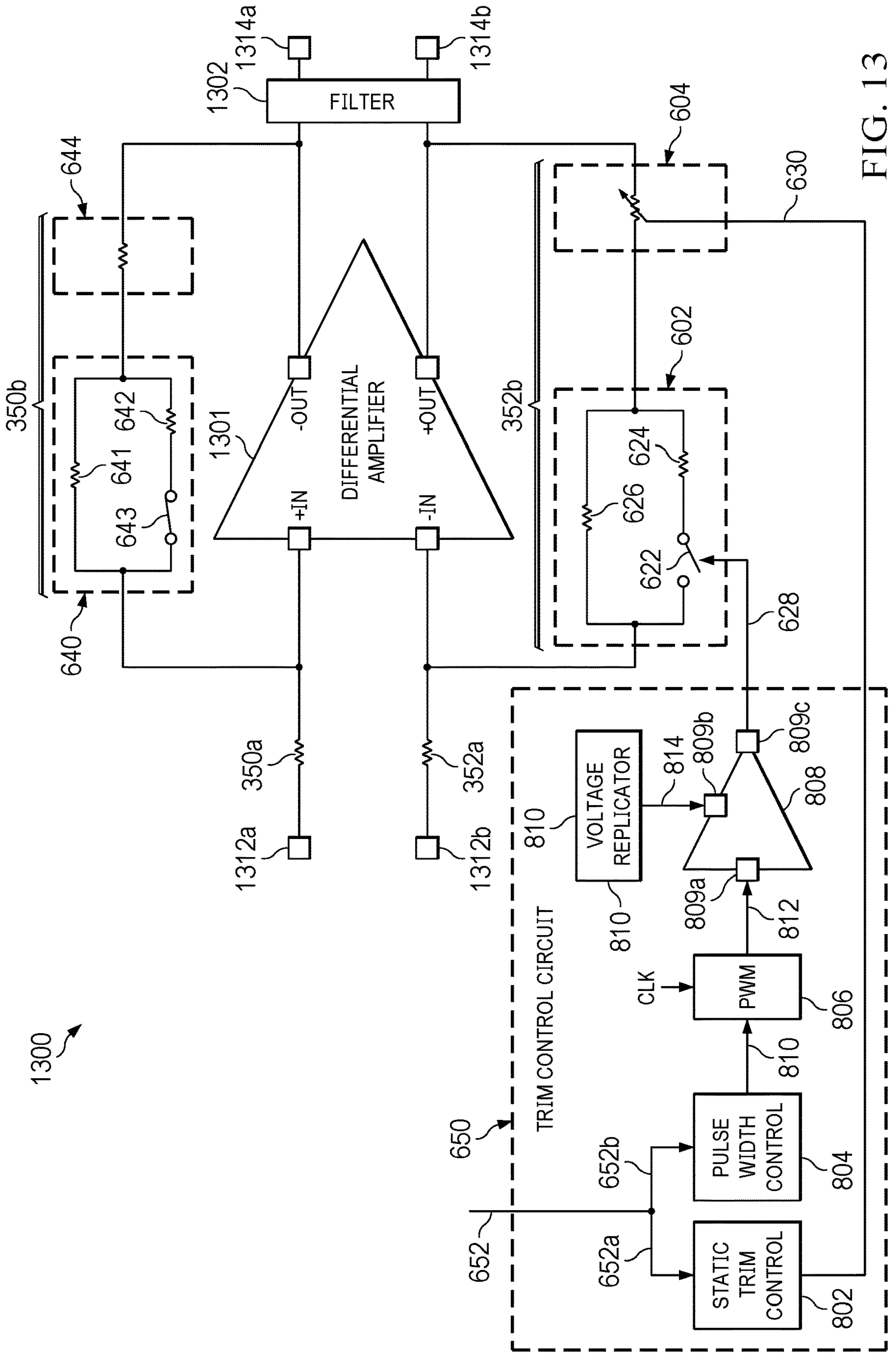
FIG. 13 is a schematic illustrating examples of a system having trimmable resistor networks.
Figure 14:
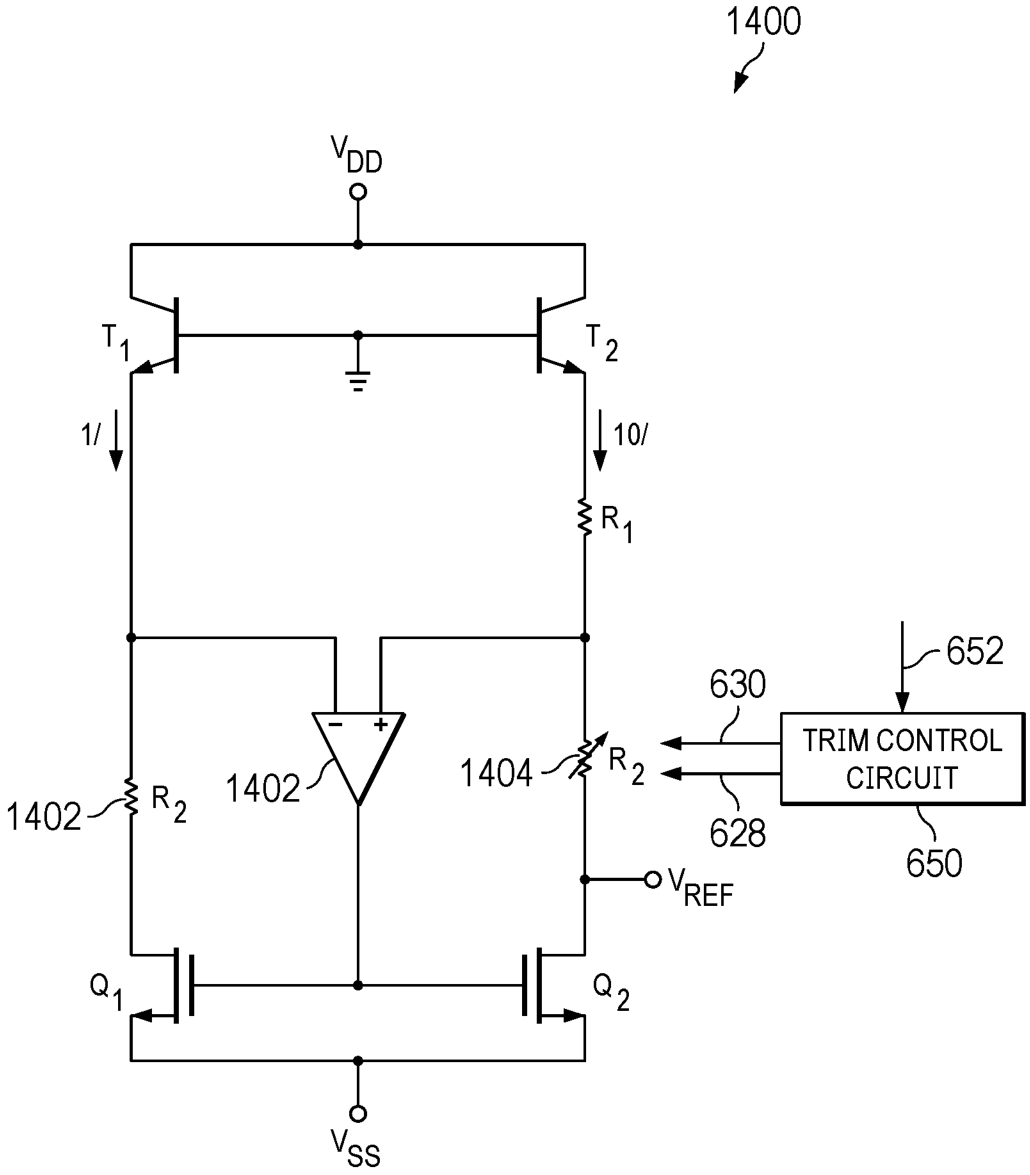
FIG. 14 is a schematic illustrating examples of a system having trimmable resistor networks.

FIG. 13 and FIG. 14 are schematics of other systems that can include trimmable resistors trimmed using a modulated signal. FIG. 13 illustrates a system 1300 including a differential amplifier 1301 and a filter 1302. System 1300 includes input resistor 350*a* coupled between an input 1312*a* and the positive input of differential amplifier 1301, and feedback resistor 350*b* coupled between the positive input and the negative output of differential amplifier 1301. System 1300 also includes input resistor 352*a* coupled between an input 1312*b* and the negative input of differential amplifier 1301, and feedback resistor 352*b* coupled between the negative input and the positive output of differential amplifier 1301. Filter 1302 is coupled between the outputs of differential amplifier 1301 and outputs 1314*a* and 1314*b*. Trim control circuit 650 can trim trimmable resistor networks 602 and 604 based on modulated signal 628 and static signals 630 to match feedback resistor 352*b* with feedback resistor 352*a*, and filter 1302 can perform averaging of the resistance of trimmable resistor 602.

FIG. 14 illustrates a system 1400. System 1400 can be a bandgap reference circuit that relies on matching resistors 1402 and 1404 to generate a precise reference voltage VREF. Resistor 1404 can include trimmable resistor networks 602 and 604 (not shown in FIG. 14), which can be trimmed by trim control circuit 650 based on modulated signal 628 and static signals 630 to match resistor 1402.

Trimmable resistor networks 602 and 604 can also be employed in other applications, such as transmission line impedance matching, data line load matching, differential communication system, or purposely introducing a precision mismatch in two delays of a two or more transmission lines. An example of which is phased array radars, the delays between the adjacent channels are controlled very precisely to increase resolution of the radar.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal," "node," "interconnection," "pin," and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, such as by an end user and/or a third party.

While the use of particular transistors is described herein, other transistors (or equivalent devices) may be used instead. For example, a p-channel field effect transistor (PFET) may be used in place of an n-channel field effect transistor (NFET) with little or no changes to the circuit. Furthermore, other types of transistors may be used, such as laterally-diffused metal-oxide semiconductor (LDMOS) FETs) and bipolar junction transistors (BJTs). Furthermore, the devices may be implemented in/over a silicon substrate (Si), a silicon carbide substrate (SiC), a gallium nitride substrate (GaN) or a gallium arsenide substrate (GaAs).

References herein to a field effect transistor (FET) being "ON" means that the conduction channel of the FET is present and drain current may flow through the FET. References herein to a FET being "OFF" means that the conduction channel is not present and drain current does not flow through the FET. A FET that is OFF, however, may have current flowing through the transistor's body-diode.

Circuits described herein are reconfigurable to include additional or different components to provide functionality at least partially similar to functionality available prior to the component replacement. Components shown as resistors, unless otherwise stated, are generally representative of any one or more elements coupled in series and/or parallel to provide an amount of impedance represented by the resistor shown. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter.

Modifications are possible in the described embodiments and examples, and other embodiments and examples are possible, within the scope of the claims, such as the examples herein below.

What is claimed is:

1. An apparatus comprising:

a first power stage having a first power stage input and a first power stage output;

a second power stage having a second power stage input and a second power stage output;

an audio driver circuit having a first driver input, a second driver input, a first driver output, and a second driver output, the first driver output coupled to the first power stage input, and the second driver output coupled to the second power stage input;

a first resistor network coupled between a first audio input of a pair of differential audio inputs and the first power stage output, the first resistor network including a trimmable resistor network, the first resistor network having a first intermediate terminal coupled to the first driver input, and a trim input;

a second resistor network coupled between a second audio input of the pair of differential audio inputs and the second power stage output, the second resistor network having a second intermediate terminal coupled to the second driver input; and a trim control circuit having a control input and a trim output, the trim output coupled to the trim input.

2. The apparatus of claim 1, wherein the audio driver circuit includes:

an amplifier having a first amplifier input, a second amplifier input, and an amplifier output, the first amplifier input coupled to the first audio input, the second amplifier input coupled to the second audio input, and the amplifier output coupled to the second driver output;

a filter having a first filter input, a second filter input, a first filter output, and a second filter output, the first filter input coupled to the first driver input, and the second filter input coupled to the second driver input; and a modulator circuit having a first modulator input, a second modulator input, a third modulator input, and a modulator output, the first modulator input coupled to the first filter output, the second modulator input coupled to the second filter output, the third modulator input coupled to the amplifier output, and the modulator output coupled to the first driver output.

3. The apparatus of claim 2, wherein the modulator circuit includes:

a signal combination circuit having a first addition input, a second addition input, a subtraction input, and a combination output, the first addition input coupled to the first modulator input, the subtraction input coupled to the second modulator input, and the second addition input coupled to the third modulator input;

a ramp generator having a ramp output; and a comparator having a first comparator input, a second comparator input, and a comparator output, the first comparator input coupled to the combination output, the second comparator input coupled to the ramp output, and the comparator output coupled to the modulator output.

4. The apparatus of claim 2, wherein the trimmable resistor network has a first terminal and a second terminal and including:

a switch and a first resistor coupled between the first and second terminals, the switch having a switch control terminal coupled to the trim input; and a second resistor coupled between the first and second terminals.

5. The apparatus of claim 4, wherein the modulator circuit is a first modulator circuit, the modulator output is a first modulator output, and the trim control circuit includes:

a duty cycle control circuit having a duty cycle control input and a duty cycle control output, the duty cycle control input coupled to the control input, and the duty cycle control circuit configured to provide a trim code representing a duty cycle at the duty cycle control output; and a second modulator circuit having a modulator control input and a second modulator output, the modulator control input coupled to the duty cycle control output, and the second modulator output coupled to the trim output, and the second modulator output configured to provide a modulated signal at the second modulator output having a duty cycle based on the trim code.

6. The apparatus of claim 5, wherein the switch is first switch, the switch control terminal is a first switch control terminal, and the second resistor network has a third terminal and a fourth terminal and including:

a second switch and a third resistor coupled between the third and fourth terminals, the second switch having a second switch control terminal; and a fourth resistor coupled between the third and fourth terminals; and the apparatus further comprises a bias generator coupled to the second switch control terminal to maintain the second switch is an always-on state.

7. The apparatus of claim 5, wherein the trim control circuit includes a modulator buffer circuit having a buffer input and a buffer output, the buffer input coupled to the second modulator output, and the buffer output coupled to the trim output;

wherein the second modulator circuit is configured to provide a first signal at the second modulator output having a first voltage swing; and wherein the modulator buffer circuit is configured to provide a second signal at the buffer output responsive to the first signal, the second signal having a second voltage swing smaller than the first voltage swing.

8. The apparatus of claim 7, wherein the modulator buffer circuit includes:

a voltage follower circuit having a voltage follower input and a voltage follower output, the voltage follower input coupled to the second driver input;

a bias generation circuit having a bias input and a bias output, the bias input coupled between the voltage follower output; and a transmission gate having a first input, a second input, a selection input, and an output, the first input coupled to the voltage follower output, the second input coupled to the bias output, and the output coupled to the trim output.

9. The apparatus of claim 8, wherein the switch includes a first transistor, and the bias generation circuit includes a diode-connected second transistor, a third resistor having a first resistance, and a current source coupled between the bias input and the bias output, the current source configured to provide a current based on an output of a bandgap voltage reference and a second resistance of a fourth resistor;

wherein the first transistor has a first threshold voltage that tracks a second threshold voltage of the diode-connected second transistor; and wherein the first resistance tracks the second resistance.

10. The apparatus of claim 5, wherein the trim input is a first trim input, the trim output is a first trim output, the switch is a first switch, the trim code is a first trim code, the trimmable resistor network is a first trimmable resistor network including the first switch, the first resistor, and the second resistor;

wherein the second resistor network includes a second trimmable resistor network, the second trimmable resistor network having second trim inputs and including segments, each network segment including a resistor and a switch, the switch of each segment has a switch control terminal coupled to a respective one of the second trim inputs; and wherein the trim control circuit has second trim outputs coupled to the second trim inputs and configured to provide a second trim code at the second trim outputs to set a resistance of the second trimmable resistor network.

11. The apparatus of claim 10, wherein the second trim code is based on a pre-determined duty cycle range of the modulated signal at the second modulator output.

12. The apparatus of claim 10, wherein the trim control circuit is configured to receive the first trim code and the second trim code at the control input.

13. The apparatus of claim 11, further comprising a calibration circuit configured to perform a calibration operation to determine the first trim code and the second trim code based on one of: a first voltage difference between the first and second power stage outputs, or a second voltage difference between the first and second driver inputs.

14. The apparatus of claim 13, wherein the trim control circuit includes a memory and is configured to, in the calibration operation:

set the first trim code to a first value;

with the first trim code set to the first value, sweep the second trim code through a set of second values;

select one of the second values for which the first or second voltage differences is at a minimum;

with the second trim code set to the one of the second values, sweep the first trim code through a set of third values; and select one of the third values for which the first or second voltage differences is below a threshold; and determine a calibrated first trim code based on the one of the second values;

determine a calibrated second trim code based on the one of the third values; and store the calibrated first trim code and the calibrated second trim code in the memory.

15. The apparatus of claim 1, wherein the trimmable resistor network is coupled between the first driver input and the first power stage output.

16. The apparatus of claim 1, wherein the trimmable resistor network is coupled between the first audio input and the first driver input.

17. An apparatus comprising:

a circuit having a first terminal and a second terminal;

a first resistor coupled to the first terminal, the first resistor having a first resistance;

a second resistor coupled to the second terminal, the second resistor having a trim input; and a modulator circuit having a control input and a modulator output, the modulator output coupled to the trim input, the modulator circuit configured to set a duty cycle of a modulated signal at the modulator output based on matching an average second resistance of the second resistor to the first resistance.

18. The apparatus of claim 17, wherein:

the circuit includes an amplifier having a positive amplifier input, a negative amplifier input, a positive amplifier output, and a negative amplifier output, the positive amplifier output coupled to the first terminal, and the negative amplifier output coupled to the second terminal;

the first resistor is coupled between the positive amplifier input and the negative amplifier output;

the second resistor is coupled between the negative amplifier input and the positive amplifier output; and the apparatus further includes a third resistor coupled between a first input and the positive amplifier input, and a fourth resistor coupled between a second input and the negative amplifier input.

19. The apparatus of claim 17, wherein the circuit includes a reference generation circuit, the first terminal is a first bias terminal, and the second terminal is a second bias terminal; and wherein the first resistor is coupled between the first bias terminal and a power terminal, and the second resistor is coupled between the second bias terminal and the power terminal.

20. A method comprising:

setting a first terminal of a first resistor network and a second terminal of a second resistor network to a first voltage, the first resistor network having a third terminal and the second resistor network having a fourth terminal, the second resistor network including a first trimmable resistor having a first trim input and a second trimmable resistor having a second trim input coupled between the second terminal and the fourth terminal;

providing a modulated signal having a first duty cycle at the first trim input based on a first trim code;

with the modulated signal having the first duty cycle, sweeping a second trim code at the second trim input through a set of first values;

selecting one of the first values for which a voltage difference between the third and fourth terminals is at a minimum;

with the second trim code at the second trim input set to the one of the first values, varying a duty cycle of the modulated signal by sweeping the first trim code through a set of second values;

selecting one of the second values for which the voltage difference is below a threshold;

determining a calibrated first trim code based on the one of the first values;

determining a calibrated second trim code based on the one of the second values; and storing the calibrated first trim code and the calibrated second trim code in a memory.

* * * * *